(12) United States Patent
Morrison

(10) Patent No.: US 11,989,047 B2
(45) Date of Patent: May 21, 2024

(54) ADAPTABLE JOYSTICK USING MAGNETICALLY-CONTROLLED RESISTANCE

(71) Applicant: Dell Products L.P., Round Rock, TX (US)

(72) Inventor: Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 17/647,703

(22) Filed: Jan. 11, 2022

(65) Prior Publication Data
US 2023/0221751 A1    Jul. 13, 2023

(51) Int. Cl.
*G06F 3/033* (2013.01)
*G01D 5/14* (2006.01)
*G05G 9/047* (2006.01)

(52) U.S. Cl.
CPC ............. *G05G 9/047* (2013.01); *G01D 5/145* (2013.01); *G05G 2009/04755* (2013.01)

(58) Field of Classification Search
CPC ......... G05G 9/047; G05G 2009/04755; G01D 5/145
USPC ........................................ 345/161, 158, 156
See application file for complete search history.

(56) References Cited

U.S. PATENT DOCUMENTS

| | | | | |
|---|---|---|---|---|
| 2012/0260760 A1* | 10/2012 | Terao | ..................... | G05G 9/047 74/471 XY |
| 2014/0246477 A1* | 9/2014 | Koch, Jr. | ................ | A61B 34/74 227/180.1 |
| 2016/0018843 A1* | 1/2016 | Lopez | ..................... | G05G 5/03 74/471 XY |
| 2016/0077543 A1* | 3/2016 | Conro | ..................... | G05G 9/047 74/471 XY |
| 2018/0058039 A1* | 3/2018 | Fredrickson | ............. | G05G 5/05 |
| 2018/0356854 A1* | 12/2018 | Spiteri | ...................... | G01D 5/26 |
| 2019/0265748 A1* | 8/2019 | Wehlmann | ............... | G05G 5/05 |
| 2020/0271479 A1* | 8/2020 | Wang | ..................... | G05G 9/047 |
| 2022/0091629 A1* | 3/2022 | Guerrero, Jr. | .......... | H05K 1/181 |

* cited by examiner

*Primary Examiner* — Thuy N Pardo
(74) *Attorney, Agent, or Firm* — Norton Rose Fulbright US LLP

(57) ABSTRACT

A user input device may provide variable (e.g., adjustable and/or adaptive) feedback. Some embodiments can include a controllable magnetic system that can be configured to selectively resist rotation of a control stick about a first and second axis. The resistance applied by the magnetic system can be adjusted based on a user input, adjusted based on an input from a computer application, dynamically based on events occurring in an application (such as feedback from events in a gaming application), or a combination of these and other feedback controls. In at least one aspect, an input device includes a shaft configured to rotate about a first axis and a second axis, the shaft having a first end and a second end opposite the first end; a first magnet configured to emit a controllable magnetic field; and a second magnet interposed between the first magnet and the first end of the joystick.

19 Claims, 18 Drawing Sheets

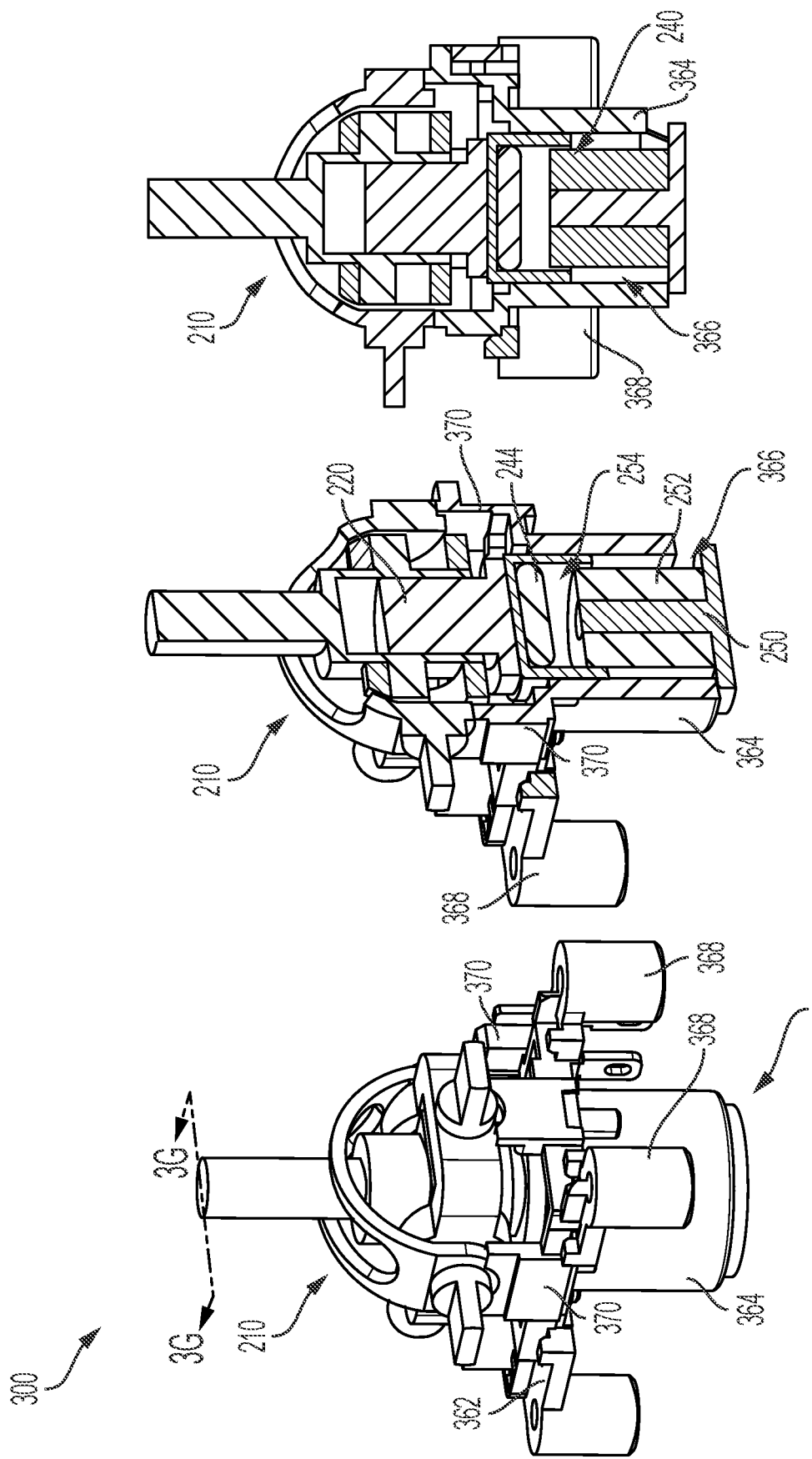

ADAPTABLE JOYSTICK USING MAGNETICALLY-CONTROLLED RESISTANCE

FIELD OF THE DISCLOSURE

The instant disclosure relates to user input devices and systems. More specifically, portions of this disclosure relate to adaptive joysticks for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

User input devices, including handheld videogame controllers, are used when operating various computer applications to enable users to provide input to operate various functions of the computer application. For example, a gaming controller can operate in conjunction with a gaming device to enable a user to provide input into an application, such as a video game, to control an object or character, select audio and/or video content, or otherwise control aspects related to the gaming device. Gaming controllers typically include multiple depressible buttons and one or more control sticks—which are able to be moved relative to a default position—that are controlled by a user to provide the input

SUMMARY

According to embodiments of this disclosure, a gaming controller, or other user input device, may be provide variable (e.g., adjustable and/or adaptive) feedback. Some embodiments can include a controllable magnetic system that can be configured to selectively resist rotation of a control stick about a first and second axis. The resistance applied by the magnetic system can be adjusted based on a user input, adjusted based on an input from a computer application, dynamically based on events occurring in an application (such as feedback from events in a gaming application), or a combination of these and other feedback controls. Some user input devices can include a processor configured as a controller to adjust the resistance torque in real-time. Some user input devices can include an interface, wired and/or wireless, to receive commands to control the resistance torque in real-time, according to schedules, or on demand.

According to one configuration of the present disclosure includes an apparatus, such as a user input device, having a shaft configured to rotate about a first axis and a second axis, the shaft having a first end and a second end opposite the first end. The apparatus can include a first magnet configured to emit a controllable magnetic field and a second magnet interposed between the first magnet and the first end of the shaft. In some configurations, the second magnet is configured to provide a force on the first end of the shaft such that the second magnet resists rotation of the shaft about at least one of the first or second axes while the first magnet emits the controllable magnetic field. The first magnet can include an electromagnet that is operable in a first state, in which the first magnet emits a magnetic field having a first intensity and a second state, in which the first magnet emits a magnetic field having a second intensity that is greater than that of the first intensity. In certain configurations, the first magnet includes a solenoid device and the second magnet includes a permanent magnet. In some configurations, the first magnet is configured to operate in a third state, in which the first magnet does not emit a magnetic field. In such configurations, while the first magnet is in the first or second state, the second magnet is configured to bias the shaft to a default position.

Some configuration of the apparatus of the present disclosure can include a processor. The processor may be coupled to the first magnet and configured to actuate the first magnet between the first state and the second state. As an example, while the shaft is in a default position and the processor actuates the first magnet from the first state to the second state, a distance between the first magnet and the second magnet increases. In some configurations, the apparatus can include a stabilizer. The stabilizer can be interposed between the second magnet and the first end of the shaft. In some configurations, the stabilizer defines a cavity configured to accommodate at least a portion of the first and second magnet.

Some configurations of the present disclosure includes a user input device having a housing that defines a chamber, a shaft coupled to the housing and configured to rotate relative to the housing about a first axis and a second axis, the shaft comprising a base and a post extending from the base, a first magnet disposed within the chamber and configured to emit a controllable magnetic field, and a second magnet configured to abut the base of the shaft such that rotation of the shaft about at least one of the first axis or the second axis moves the second magnet in a first direction. In some aspects of the user input device, while the first magnet emits the magnetic field, the second magnet resists movement in the first direction. The base of the shaft may include a maximum transverse dimension that is greater than a maximum transverse dimension of the post. Additionally, or alternatively, the second magnet may include a maximum transverse dimension that is greater than the maximum transverse dimension of the base. In some configurations, when the shaft is in a central position, the shaft, the post and the second magnet are coaxial.

Certain configurations of the user input device include a stabilizer configured to limit the movement of the second magnet along the first and second axis. Additionally, or alternatively, the user input device can include a power source configured to deliver electrical current to the first magnet and a processor in coupled to the power source and configured to control an intensity of the controllable magnetic field emitted by the first magnet. In some such configurations, the processor is configured to operate the first magnet in a reserve state and an energized state, in which the intensity of the magnetic field emitted by the first magnet is greater than that in the reserve state. For example, the processor can be configured to operate the first magnet in a reserve state based on receiving a first signal and operate the first magnet in an energized state based on receiving a second signal. The force applied to the shaft by the second magnet is greater while the first magnet is in the energized state than while the first magnet is in the reserve state.

Some configurations of the present disclosure may include a gaming system. The gaming system may include a gaming controller configured to transmit a plurality of signals (e.g., user input signals) to an information handling system. In some configurations, the gaming controller can include a joystick configured to rotate about a first axis and a second axis based on user input and a magnetic resistance mechanism configured to selectively resist rotation of the joystick about at least one of the first axis or the second axis. In some configurations, the magnetic resistance mechanism includes a first magnet comprising a solenoid device and a second magnet comprising a permanent magnet. The gaming controller may also include a processor configured to perform one or more operations with respect to the controller. As an example, the processor can be coupled to the magnetic resistance mechanism and configured to receive a first input associated with a target resistance value and, based on the target resistance value, operate the magnetic resistance mechanism to emit a first magnetic field having a first field strength. The processor can be configured to receive a second input associated with a second resistance value and, based on the second input, operate the magnetic resistance mechanism to emit a second magnetic field having a second field strength that is greater than the first field strength. In some such configurations, while the magnetic resistance mechanism emits the first magnetic field, the magnetic resistance mechanism applies a first resistance to the joystick andwhile the magnetic resistance mechanism emits the second magnetic field, the magnetic resistance mechanism applies a second resistance to the joystick, the second resistance being greater than the first resistance.

According to another configuration, a method may include manufacturing, constructing, operating, or otherwise using the configurations of the present disclosure, such as the described user input devices, joystick assemblies, gaming systems, or the like. In some aspects, the method can include receiving feedback instruction from an information handling system and operating the joystick based on the feedback instructions. In some configurations, the method can include controlling a resistance torque applied to a joystick (e.g., shaft) as the joystick rotates about a first or second axis.

Another embodiment of the present disclosure includes receiving (such as over a wired, such as a USB cable, or wireless interface, such as Wi-Fi or Bluetooth connection), at a controller of a user input device, a feedback instruction from an information handling system. The feedback instruction may include a value associated with a resistance of a joystick or other control signal for operating a magnetic resistance element such as those described herein.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 3F shows another perspective view of the user input device of FIG. 2A.

FIGS. 3G and 3H are perspective sectional views of the user input device taken about plane 3G-3G of FIG. 3F.

DETAILED DESCRIPTION

User input devices, including handheld videogame controllers, are frequently used when operating various computer applications to enable users to provide input and operate or control various functions of the computer application. For example, a gaming controller can operate in conjunction with a gaming device to enable a user to provide input into an application, such as a video game, to control an object or character, select audio and/or video content, or otherwise control aspects related to the gaming device. Gaming controllers typically include multiple depressible buttons and one or more control sticks—which are able to be moved relative to a default position—that are controlled by a user to provide the input.

Current control sticks for game controllers allow two-dimensional input by resiliently rotating along multiple axes about a center, default position. Input can then be provided based on the position of the control stick in relation to the default position. Conventional control sticks are biased relative to the default position so that a user must actively apply a force to the control stick to provide the input. Some video games require very precise movement of the control sticks, including holding a relative position for an extended period of time as well as quickly moving the control stick from opposing sides (e.g., down to up, left to right, etc.). Additionally, not all users have the same preferences for the movement of the control sticks, with some users preferring more sensitive movements and other preferring less sensitive movements. Conventional gaming controllers provide no native option for altering the control stick sensitivity without disassembly of the controller.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

Figure 1A:
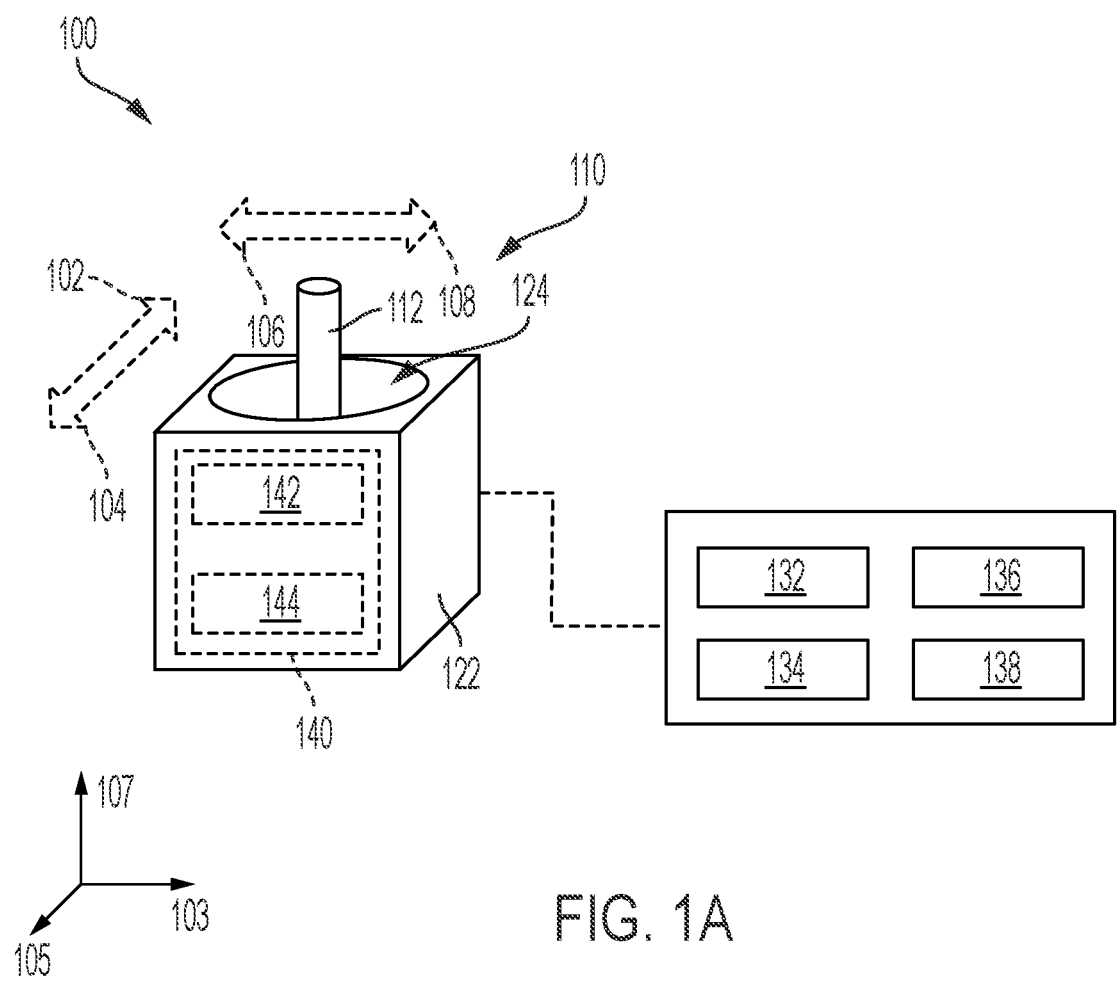
FIG. 1A is a schematic diagram of an example of a user input device according to one or more aspects of the present disclosure.
Figure 1D:
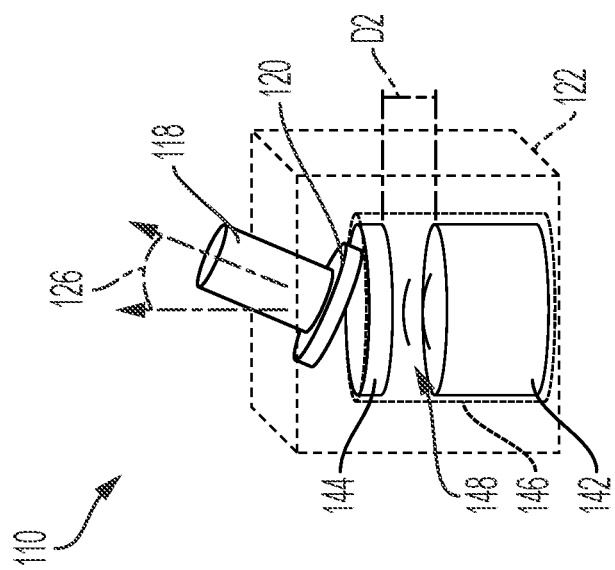
FIGS. 1B-1D show schematic examples of a user input device according to one or more aspects of the present disclosure in a first, second, and third configuration, respectively.
Figure 1C:
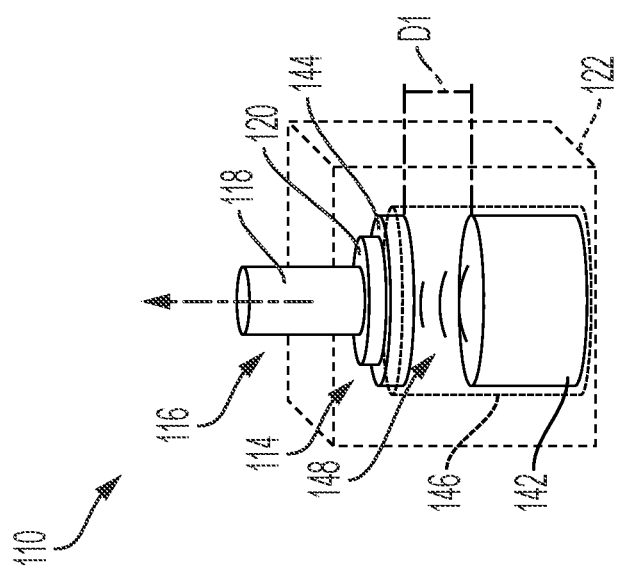
Figure 1B:
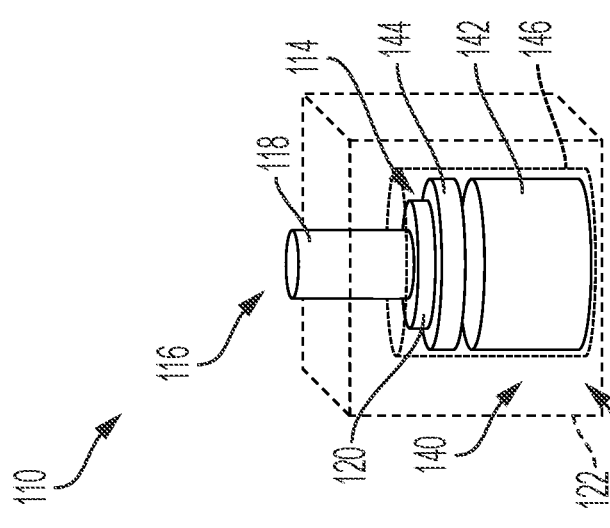

Referring now to FIGS. 1A-1C, shown is an illustrative configuration of a user input device 100 (device 100) having adjustable resistance features. As shown, device 100 includes a joystick assembly 110 having a joystick 112 (e.g., a shaft) that can be manipulated by a user along two-axes (e.g., 103, 105) for controlling or otherwise interacting with an electronic application (e.g., video game or other application) and a magnetic resistance mechanism 140 configured to selectively apply a force to the joystick 112. Joystick assembly 110, magnetic resistance mechanism 140, or both, can be coupled to one or more electrical components, such as a processor 132.

Joystick assembly 110 includes joystick 112 (e.g., control stick, analog stick, thumb stick, etc.) that is moveable relative to at least one other portion of joystick assembly 110, in at least four directions, such as, for example a first direction 102, a second direction 104 that is opposite the first direction, a third direction 106, and a fourth direction 108 that is opposite the third direction (collectively, "the directions"). As shown in FIGS. 1A, joystick assembly 110 includes a housing 122 that defines a chamber 124 configured to accommodate at least a portion of joystick 112. Housing 122 can include or correspond to a joystick housing, a gaming controller housing, or the like. In some configurations, joystick 112 is rotatable about a plurality of axes, such as a first axis 103 (e.g., x-axis) to move in first and second directions 102, 104 and a second axis 105 (e.g., y-axis) to move in third and fourth directions 106, 108. For example, joystick 112 is configured to be rotated by a user, about first axis 103 and second axis 105, from a default position (e.g., center position shown in FIGS. 1A, 1B, 1C) to a rotational position (e.g., shown in FIG. 1D). In some configurations, joystick 112 is biased toward the default position and is configured to return to the default position when the user force is removed.

Magnetic resistance mechanism 140 includes a first magnet 142 and a second magnet 144 configured to resist rotation of joystick 112 about first axis 103, second axis 105, or both. First and second magnets 142, 144 include magnetic components that are configured to generate or react to magnetic fields. As an illustrative example, first magnet 142 includes an electromagnet (e.g., solenoid) that is configured to emit a controllable magnetic field (e.g., 148) and second magnet 144 includes a permanent magnet configured to react to the magnetic field. In such configurations, first magnet 142 may generate a magnetic field (e.g., 148) having a specific force and direction to push second magnet 144 away from first magnet 142. Second magnet 144 may be coupled to joystick 112 and may be configured to apply a force to the joystick to resist rotation of the joystick 112, as described further herein at least with reference to FIGS. 1B-1D.

Device 100 can include one or more electrical components in communication with joystick assembly 110, magnetic resistance mechanism 140, or both, to perform the operations described herein. As shown in FIG. 1A, device 100 may include, or be coupled to, a processor 132, a memory 134, one or more sensor(s) 136, a power source 138, or the like. The illustration of device 100 in FIG. 1A is illustrative and, in some other implementations, the described herein may not include all of the components shown in FIG. 1A or may include additional components (e.g., as shown in FIGS. 2A-7). Additionally, or alternatively, joystick assembly 110 may include one or more additional components, such as a controller housing, a button, thumb cap, one or more sensors, circuitry, or the like, and can include components such as those found in a Stick Controller from ALPS®, various types of game controllers from Microsoft® Xbox® controllers developed by Microsoft Corporation of Redmond, Wash., United States, the PlayStation® DualShock® 3 and 4 controllers, developed by Sony Computer Entertainment, Inc., of Tokyo, Japan, or the like.

Processor 132 may be a central processing unit (CPU), microcontroller a field-programmable gate array (FPGA) device, an application-specific integrated circuits (ASIC), another hardware device, a firmware device, other computing circuitry or any combination thereof. Memory 134 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 134 may store data, such as joystick position data (e.g., a relative distance between a rotational position and the default position), resistance data, game configuration data (e.g., data or instructions from an external gaming device), or the like. Additionally, or alternatively, memory 134 may store one or more thresholds such as positional thresholds, rotation thresholds, resistance thresholds, or the like.

Memory 134 may also store instructions that, when executed by processor 132, cause the processor to perform one or more operations with the user input devices (e.g., 100), as described herein. For example, processor 132 may be configured to adjust a resistance that magnetic resistance mechanism 140 applies to joystick 112 as the joystick moves away from the default position (e.g., in the first, second, third, or fourth directions). In such configurations, processor 132 may cause first magnet 142 to generate a magnetic field (e.g., 148) with a specific force and direction to push second magnet 144 away from first magnet 142 towards joystick 112. In a specific, non-illustrative configuration, processor 132 is configured to cause magnetic resistance mechanism 140 to exert a first force on joystick 112 at a first time and exert a second force on the joystick at a second time, the second force being different (e.g., greater or less than) the first resistance torque. In some configurations, processor 132 may be configured to adjust a force that magnetic resistance mechanism 140 applies to joystick 112 based on an input signal, such as a signal from a user input, an external gaming device, or the like. For example, a user may select a target resistance value to be applied to joystick 112 based on the user's preference and processor may operate magnetic resistance mechanism 140 to emit a magnetic field associated with the target resistance value. It should be understood that memory 134 may be configured to store other instructions, thresholds, or data sets that are not explicitly described herein.

Sensors 136 can include be coupled to joystick 112, magnetic resistance mechanism 140, or both. For example, sensor 136 can be configured to determine a position of joystick 112, such as an angular position of the joystick. Additionally, or alternatively, sensor 136 can be configured to determine a strength of a magnetic field emitted by magnetic resistance mechanism 140, a position of first magnet 142 or second magnet 144, or combination thereof. In a specific, non-limiting example, sensor 136 can include a potentiometers, hall sensor, mechanical switch, optical sensor, other position detector sensors, or the like. Sensors 136 may be in communication with processor 132 to provide information to the processor.

Power source 138 may be coupled to joystick assembly 110, processor 132, sensors 136, magnetic resistance mechanism 140, or other components of device 100. In some implementations, power source 138 may include a battery, capacitors, a charge storage device, or the like. Power source 138 may be rechargeable (e.g., a rechargeable battery) or removable/replaceable (e.g., a replaceable battery). For example, power source 138 may be a battery, such as a lithium ion battery, a lithium ion polymer (LiPo) battery, a nickel-metal hydride (NiMH) battery, a thin film lithium battery, a zinc battery, or the like. In some configurations, processor 132 may control an amount of electrical current power source 138 supplies to magnetic resistance mechanism 140 (e.g., first magnet 142) to adjust a force the magnetic resistance mechanism applies to joystick 112.

Referring now to FIGS. 1B-1D, shown are illustrative examples of device 100 in different configurations to illustrate the operation of the device. For example, FIG. 1B shows device 100 with joystick 112 in a default position and first magnet 142 in an reserve state; FIG. 1C shows device 100 with joystick 112 in the default position and first magnet 142 in an energized state; and FIG. 1C shows device 100 with joystick 112 in a rotational position and first magnet 142 in the energized state.

As depicted in FIG. 1B, joystick 112 (e.g., control stick, analog stick, thumbstick, etc.) includes a first end 114 that is disposed within chamber 124 of housing 122 and a second end 116 that extends outside of the housing. Joystick 112 may include a post 118 extending between first and second ends 114, 116 and base 120 disposed at the first end. Base 120 may be disposed completely within chamber 124 while at least a portion of post 118 (e.g., at second end) outside of the housing 122. For example, post 118 may extend through an aperture that is defined by housing 122 and in communication with chamber 124. Base 120 extends laterally away from post 118 and has a transverse dimension that is greater than a transverse dimension of the post. In some configurations, joystick 112 (e.g., base 120 and post 118) has a maximum transverse dimension that is less than a maximum transverse dimension of magnetic resistance mechanism 140 (e.g., first magnet, second magnet, stabilizer, or combination thereof). As joystick 112 rotates about first axis 103, second axis 105, or both, a portion of base 120 (e.g., periphery) is configured to move in a vertical direction (e.g., downward along axis 107), as described herein. In the depicted configurations, base 120 is cylindrical, however, in other configurations, the base may be shaped in any suitable manner (e.g., curved, rectangular, parabolic, or combination thereof) to operate with magnetic resistance mechanism 140.

As further depicted in FIG. 1B, magnetic resistance mechanism 140 includes first magnet 142, second magnet 144, and, in some configurations, a stabilizer 146. First magnet 142 is disposed within housing 122 and configured to generate a magnetic field 148 that affects second magnet 144. As shown, second magnet 144 is interposed between first magnet 142 and first end 114 of joystick 112. In some configurations, second magnet 144 may be coupled to joystick 112 (e.g., at base 120) and moveable relative to first magnet 142 via magnetic field 148 (e.g., elevated). For example, second magnet 144 may abut first end 114 of joystick 112 (e.g., base 120) and can be directly or indirectly coupled to the first end. In such configurations, first magnet 142 may push second magnet 144 in a vertical direction to provide a vertical force on the first end 114 of the joystick 112. To illustrate, first magnet 142 may be actuated from a reserve state (FIG. 1B) to an energized state (FIG. 1C) to increase an intensity of magnetic field 148 in a vertical direction (e.g., along axis 107) to move second magnet 144 and joystick 112 upward in the vertical direction. In some such configurations, second magnet 144 is configured to levitate upwards to contact base 120 and move post 118 further upwards (e.g., outside of housing 122). In some configurations, an intensity of magnetic field 148 emitted by first magnet 142 is increased from the reserve state to the energized state. In other configurations, the first magnet may not emit the magnetic field in the reserve state.

Stabilizer 146 is configured to limit the movement of second magnet 144 and can be included in, or coupled to, housing 122. For example, stabilizer 146 may be configured to enable second magnet 144 to move along a third axis 107 (e.g., vertically up and down) but prevent the second magnet from moving in other directions (e.g., along axes 103, 105), rotating in certain directions, or both. Stabilizer 146 can be the same shape (e.g., in the cross-sectional direction) as second magnet 144, first magnet 142, or both. In the depicted configuration, second magnet 144 includes an annular, disc-shaped magnet and stabilizer 146 includes a cylindrical shell disposed around the second magnet to prevent the second magnet from moving laterally. Additionally, or alternatively, stabilizer 146 can include a rod configured to be received by an aperture of second magnet 144 so that the second magnet can extend longitudinally along the rod, but not in a lateral direction. In other configurations, stabilizer can otherwise be structured to control the movement of second magnet 144.

Magnetic resistance mechanism 140 can be operated to maintain a constant, or near constant, force to joystick 112 while the joystick is stationary (e.g., in equilibrium). For example, as shown in FIG. 1C, magnetic resistance mechanism 140 is operated such that first and second magnets 142, 144 are spaced apart by an energized distance D1. In some such configurations, first magnet 142 can emit magnetic field 148 at a constant intensity to keep distance D1 constant until an external force is applied to the system. Distance D1 may be increased or decreased by adjusting the intensity of magnetic field 148 and other forces applied to joystick 112. Additionally, or alternatively, magnetic resistance mechanism 140 (or other component of device 100) may limit a maximum distance (e.g., D1) between first and second magnets 142, 144. In such configurations, increasing the intensity of magnetic field 148 provides a greater force against joystick 112 without increasing the distance between magnets. Magnetic resistance mechanism 140 can thus be controlled (e.g., via processor 132) to set a force that is applied to joystick 112 while the joystick is in equilibrium.

As joystick 112 rotates from the default position (FIG. 1C) to a rotational position (FIG. 1D), a portion of the joystick (e.g., base 120) is configured to exert a downward force on second magnet 144 to decrease the distance between the first and second magnets 142, 144 to a compressed distance D2 that is less than distance D1. As depicted, while joystick 112 is in the rotational position, base 120 pushes downward on the second magnet 144 and magnetic field 148 applies an opposing force to the second magnet, thereby resisting rotation of the joystick. The strength of magnetic field 148 or the amount of force applied by base 120 contribute to the amount of resistance a user feels when moving joystick from the default position or between rotational positions. In some configurations, base 120, second magnet 144, or other component of device 100 may be shaped such that a resistance applied to joystick 112 increases as a rotation angle 126 of the joystick increases, as measured from the default position. In other configurations, the resistance applied to joystick 112 may be independent from rotation angle 126.

In some configurations, once an external force (e.g., user's thumb) is removed from joystick 112, magnetic resistance mechanism 140 pushes the joystick back to the default position. In some configurations, first magnet 142 may include multiple magnets such that one of the magnets may be deactivated when the first magnet is in the reserve state. As a non-limiting example, first magnet 142 can include a electromagnet that can be adjusted to increase the intensity of magnetic field 148 in the energized state and a permanent magnet that is configured to provide a biasing force when the electromagnet is deactivated (e.g., in the reserve state). Additionally, or alternatively, joystick assembly 110 may include one or more mechanical components (e.g., spring) configured to bias joystick 112 toward the default position. In such configurations, device 100 may be more energy efficient by relying on energy sources other than magnetic resistance mechanism 140 to provide resistance to joystick 112.

As described herein, user input device 100 is capable of being adjustable according to the preferences of a user, a gaming developer, or the like. Further, device 100 can control a resistance of joystick 112 electronically, without having to use any special tools or disassemble the device. For example, magnetic resistance mechanism 140 and processor 132 can cooperate to selectively resist rotation of a joystick (e.g., 112) about a first axis, a second axis, or both. In some such configurations, this resistance may be adjusted in real time based on a user input, an input from a computer application, or both, as further described herein.

Figure 2A:
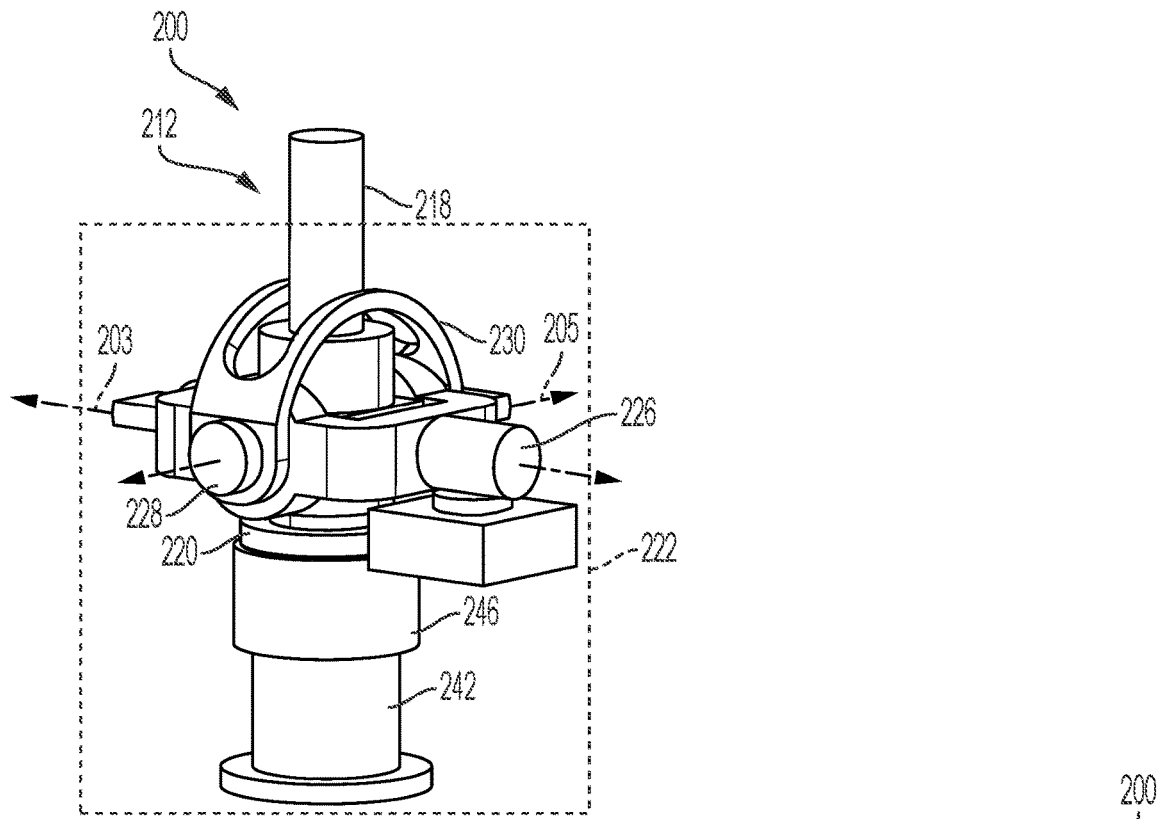
FIGS. 2A and 2B show perspective views of another example a user input device according to one or more aspects of the present disclosure.
Figure 2B:
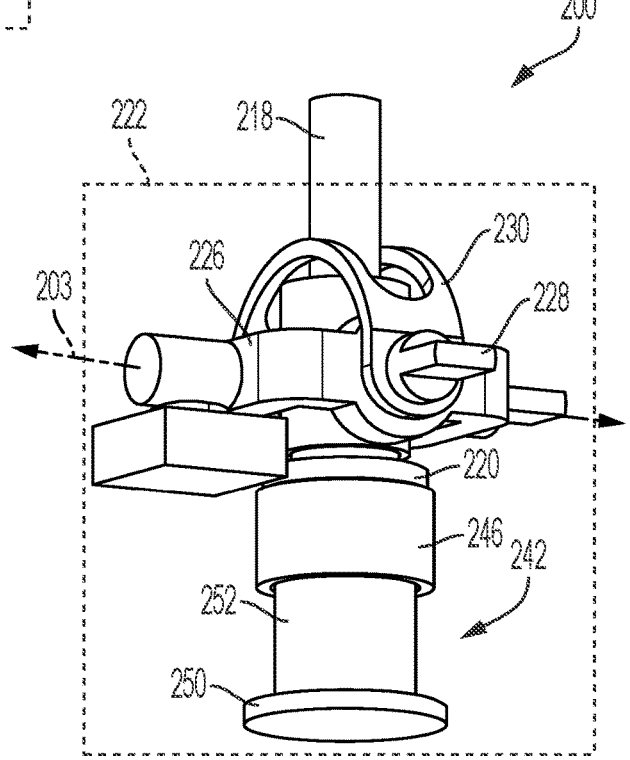
Figure 2C:
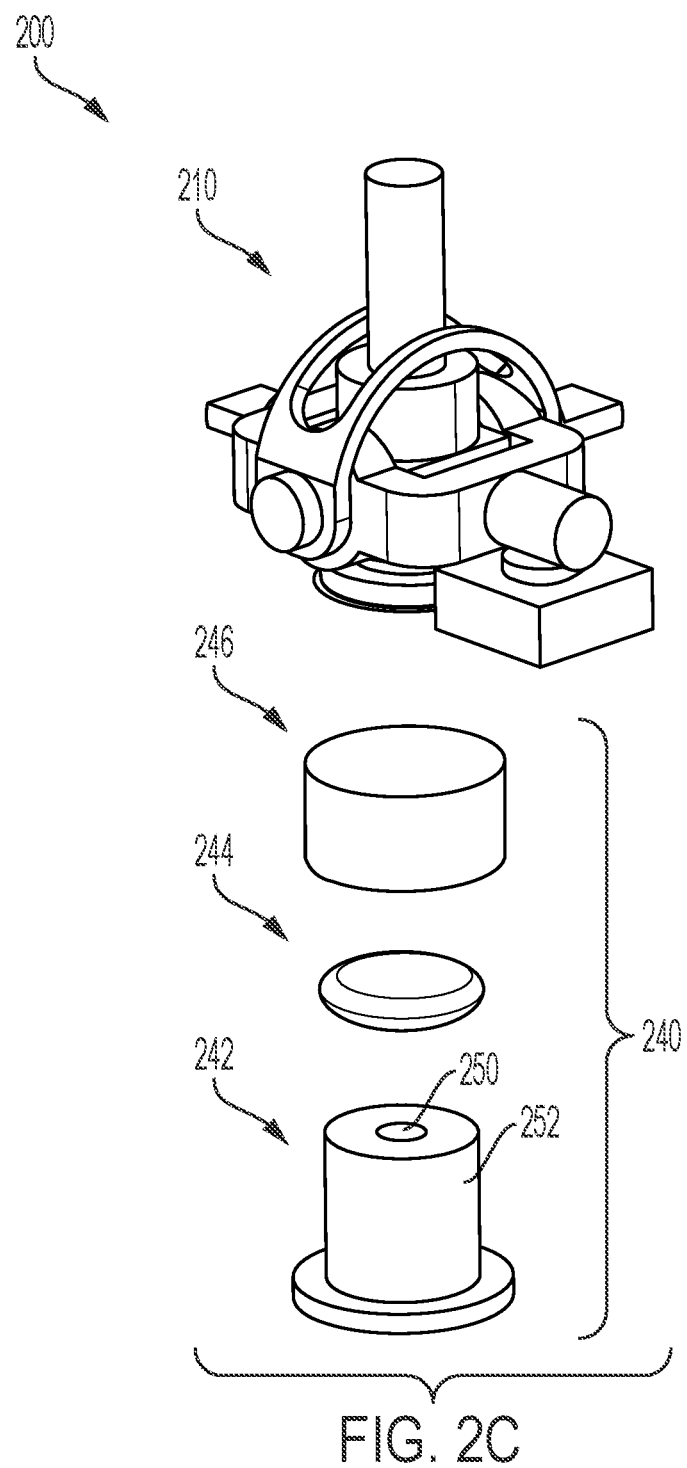
FIG. 2C shows an exploded view of the user input device of FIG. 2A.
Figure 2D:
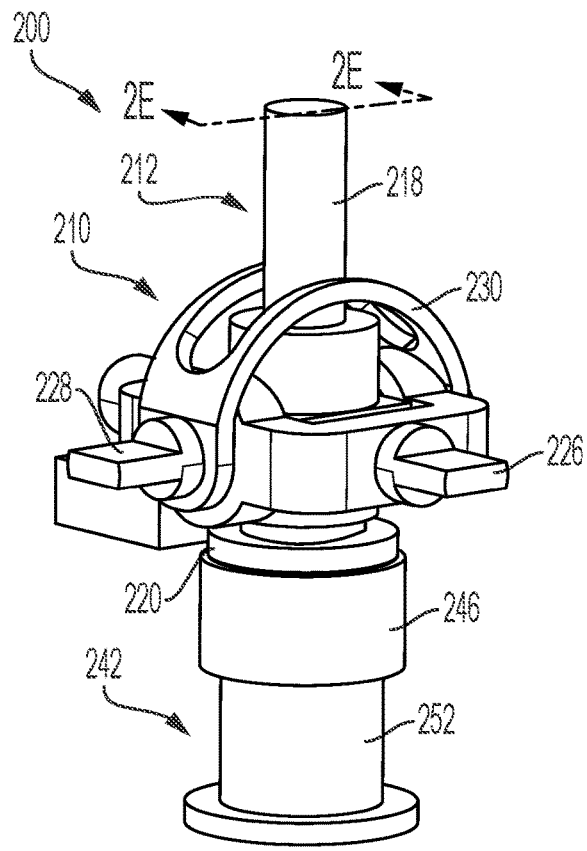
FIG. 2D shows another perspective view of the user input device of FIG. 2A.
Figure 2E:
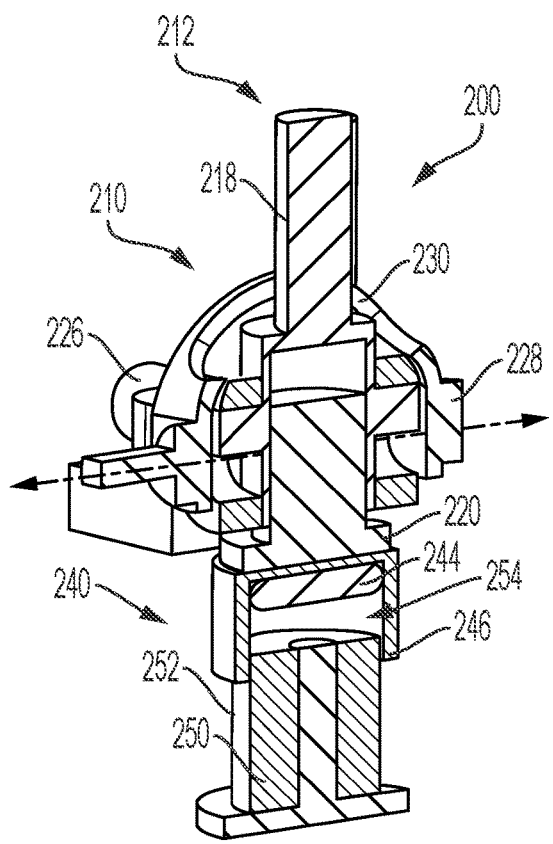
FIG. 2E shows a perspective sectional views of the user input device taken about plane 1E-1E of FIG. 2D.

Referring to FIG. 2A-2F, views of an example of a user-input device 200 (device 200) are shown. For example, FIGS. 2A and 2B show perspective views of an example of device 200; FIG. 2C shows an exploded view of an example of device 200; FIG. 2D shows another perspective view of an example of device 200; and FIG. 2E shows a perspective sectional view of an example of device 200.

Device 200 includes a joystick assembly 210 and a magnetic resistance mechanism 240. Joystick assembly 210 and magnetic resistance mechanism 240 may include or correspond to joystick assembly 110 and magnetic resistance mechanism 140, respectively. For example, joystick assembly 210 includes a joystick 212, a post 218, a base 220 that may include or correspond to joystick 112, post 118, and base 120, respectively. Additionally, or alternatively, magnetic resistance mechanism 240 can include a first magnet 242, a second magnet 244, and a stabilizer 246 that may include or correspond to first magnet 142, second magnet 144, and stabilizer 146, respectively. Device 200 may include one or more additional components that are not illustrated to improve clarity. For example device 200 can include one or more electrical components (e.g., processor 132, memory 134, sensors 136, power source 138, circuit board, or other circuitry).

As shown in FIGS. 2A and 2B, joystick 112 includes a post 218 that partially extends outside of a housing 222 such that joystick 112 is accessible by a user. For example, post 118 can be directly manipulated by a user or, in some configurations, one or more components (e.g., thumb cap) can be coupled to post 118 that are configured to be manipulated by the user. Base 220 is disposed within housing 222 and configured to rotate along with post 218, as described herein. As shown in FIG. 2E, base 220 can be separate from post 218 and moveable relative to the post along an axis (e.g., 107). In some such configurations, post 218 may define a passage that is configured to receive base 220 and the base may move within the passage without moving the post. In this way and others, post 218 can remain at a constant height relative to housing 222 while a resistance of joystick 212 is otherwise adjusted, as described herein. In other configurations, base 220 and post 218 can be unitary. Although not shown, joystick 112 can include one or more additional components, such as a spring (e.g., compression spring), configured to assist with the movement (e.g., biasing) of the joystick 112.

Joystick assembly 210 may include a first stabilizing member 226 (member 226) coupled to joystick 212 and configured to rotate with the joystick about a first axis 203 and a second stabilizing member 228 (member 228) coupled to the joystick and configured to rotate with the joystick about a second axis 205 that is orthogonal to the first axis. First and second members 226, 228 can be configured to rotation with joystick 212 about a single axis. In some configurations, second member 228 may include a collar 230 that defines an elongated slot that extends along second axis 205. In such configurations, as joystick 212 rotates about first axis 203, the joystick does not engage collar 230. On the other hand, as joystick 212 rotates about second axis 205, the joystick engages with collar 230 to rotate second member 228 about the second axis. In some configurations, first member 226 may be structured such that rotation of joystick 212 about first axis 203 rotates the first member, but rotation of the joystick about second axis 205 does not rotate the first member. Sensors (e.g., potentiometers, hall sensors, or the like) can be coupled to an end of first member 226, second member 228, or both, to determine a rotation angle (e.g., 126) of joystick 212 about the first and second axis 203, 205.

As shown in FIGS. 2C and 2E, first magnet 242, second magnet 244, and stabilizer 146 can be aligned with (e.g., coaxial with) joystick 212. First magnet 242 is configured to generate a magnetic field (e.g., 148) and, in some configurations, the first magnet includes an electromagnet. For example, in the depicted configurations, first magnet 242 can include a core 250 (e.g., iron core) and a coil 252 configured to surround the core. Coil 252 may be configured to receive electrical current (e.g., from power source 138) and cooperate with core 250 to generate a magnetic field having a force aligned in a certain direction (e.g., along axis 107). First magnet 242 may be actuated between a reserve state (e.g., low or no magnetic field as shown in FIG. 2F) and an energized state (e.g., medium or high magnetic field, as shown in FIG. 2G) to move second magnet 244 relative to the first magnet.

Stabilizer 246 can be shaped (e.g., having a top surface and sidewalls) to define a cavity 254 configured to accommodate second magnet 244. In such configurations, stabilizer 246 may be moveable relative to joystick 212 and configured to abut (e.g., be in contact with) base 220. Cavity 254 is configured to accommodate second magnet 244 and at least a portion of first magnet 242. For example, FIG. 2E shows that a top portion of first magnet 242 and an entirety of second magnet 244 can be disposed within cavity 254 when the first magnet is in the energized state. In such configurations, stabilizer 246 prevents second magnet 244 from rotating or moving in one or more directions (e.g., along axes 103, 105) and can maintain the alignment between the first and second magnets 242, 244 while the second magnet is moving. First magnet 242, second magnet 244, and stabilizer 146 can be the same shape (e.g., in a cross-sectional direction) and can be sized to have little to no interference. For example, maximum transverse dimensions of first magnet 242, second magnet 244, and cavity 154 can be within 10% of one another (e.g., within 5, 3, or 2%). Additionally, or alternatively, an interference between first or second magnets 242, 244 and cavity 154 may be less than 1 centimeter (cm), such as, less than 5, 4, 3, 2, or 1 millimeter (mm). In an alternative configurations, device 200 may not include stabilizer 246 and, as an example, core 250 can extend through an aperture defined by second magnet 244 to prevent lateral movement of the second magnet. In some such alternative configurations, core 250 may abut base 220 while first magnet is in the reserve state.

Figure 2F:
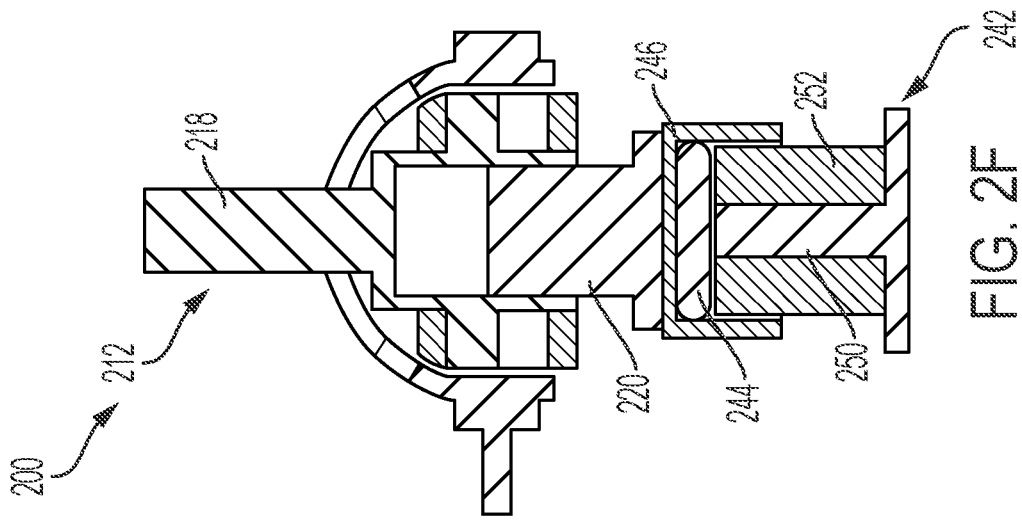
FIGS. 2F and 2H are side sectional views of the user input device in a first, second, and third configuration, respectively.
Figure 2G:
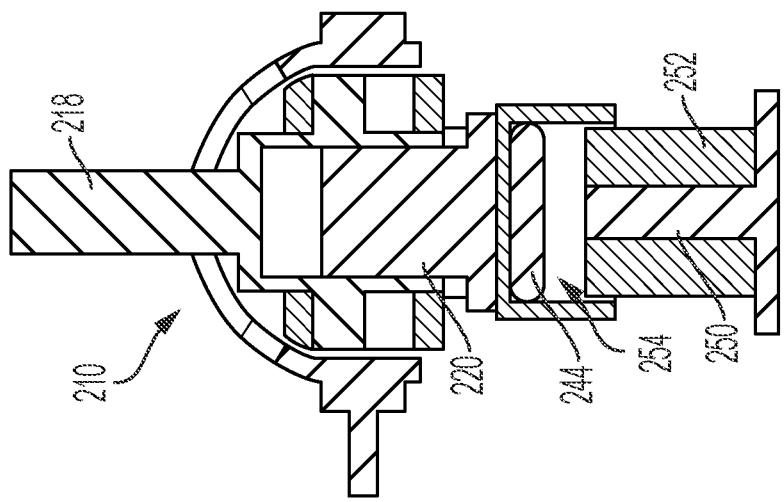
Figure 2H:
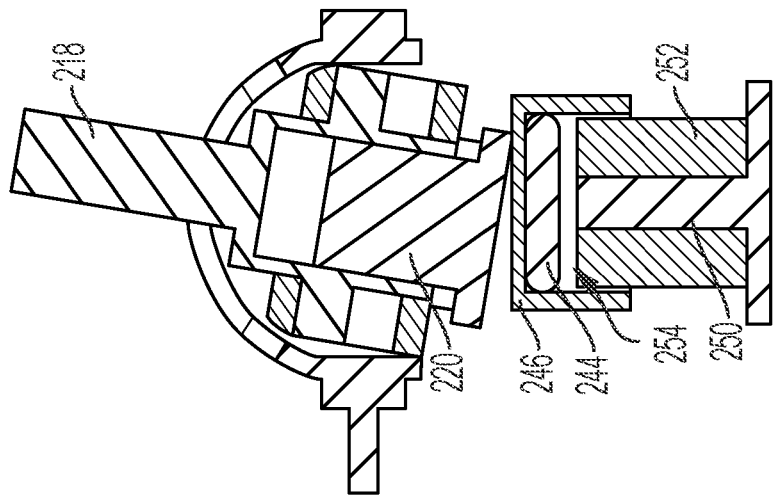

Referring now to FIGS. 2F-2H, shown are illustrative examples of device 200 in different configurations to illustrate the operation of the device. For example, FIG. 2F shows device 200 with joystick 212 in a default position and first magnet 242 in the reserve state; FIG. 2G shows device 200 with joystick 212 in the default position and first magnet 242 in an energized state; and FIG. 2H shows device 200 with joystick 212 in a rotational position and first magnet 242 in the energized state.

To illustrate, electrical current may be supplied to coil 252 (e.g., based on instructions from processor) to actuate first magnet 242 from a reserve state (FIG. 2F) to an energized state (FIG. 2G) to move second magnet 244 and base 220 upward in a vertical direction. In the depicted configurations, second magnet 244 and stabilizer 246 are configured to move base 220 relative to post 218 to reduce a gap between the two components. In such configurations, magnetic resistance mechanism 240 does not move post 218 upwardly such that the resistance of joystick 212 can be controlled without changing a height of the joystick. First magnet 242 can be operated to increase or decrease a magnetic force applied to second magnet 244 until a target resistance is achieved. Magnetic resistance mechanism 240 can maintain a constant, or near constant, force to joystick 112 to maintain the target resistance. As joystick 112 rotates from the default position (FIG. 2G) to a rotational position (FIG. 2H), a portion of base 220 is configured to extend downward to exert a force on stabilizer 246. Second magnet 244 resists the downward, rotational movement of base 220 and applies an opposing force to stabilizer 246. First magnet 242 can be controlled to adjust this opposing force (e.g., via magnetic field 148) and accurately control a resistance applied to joystick 212 as it moves from the default position or between rotational positions. Second magnet 244 and stabilizer 246 can be configured to return joystick 212 back to the default position (FIG. 2G) after an external force is removed from the joystick. In some such configurations, magnetic resistance mechanism 240 can bias joystick 212 toward the default position: alone or in combination with one or more other components of device 200 (e.g., a compressional spring).

Figure 3A:
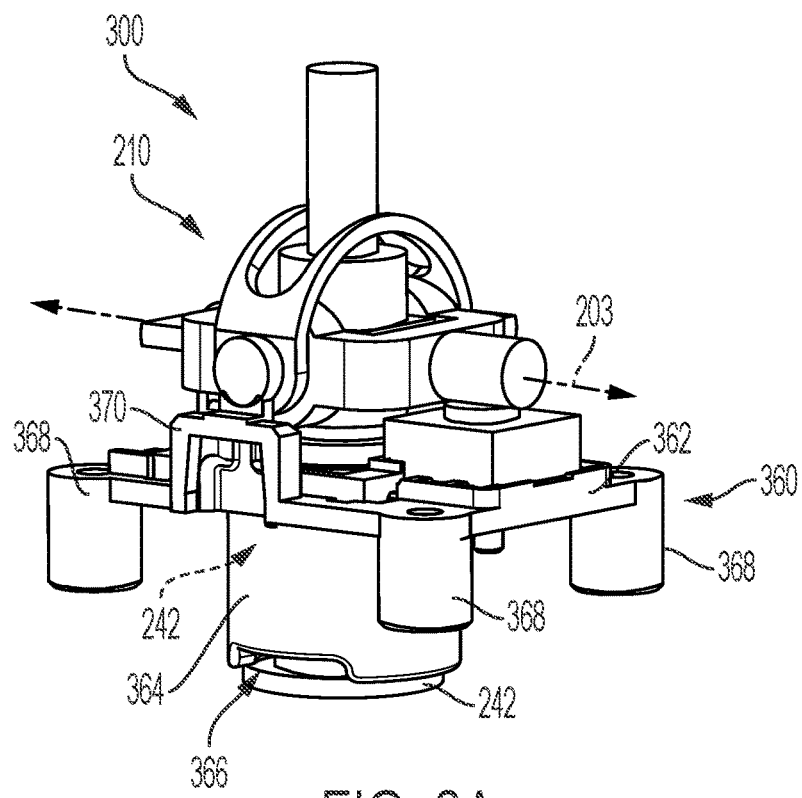
FIGS. 3A and 3B show perspective views of another example a user input device according to one or more aspects of the present disclosure.
Figure 3B:
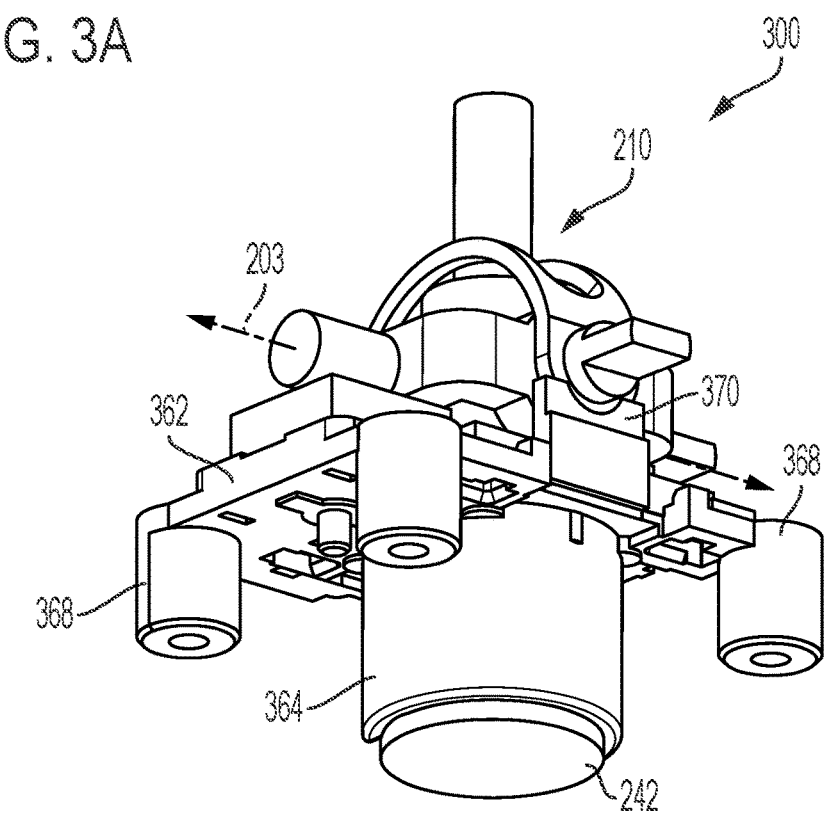
Figure 3C:
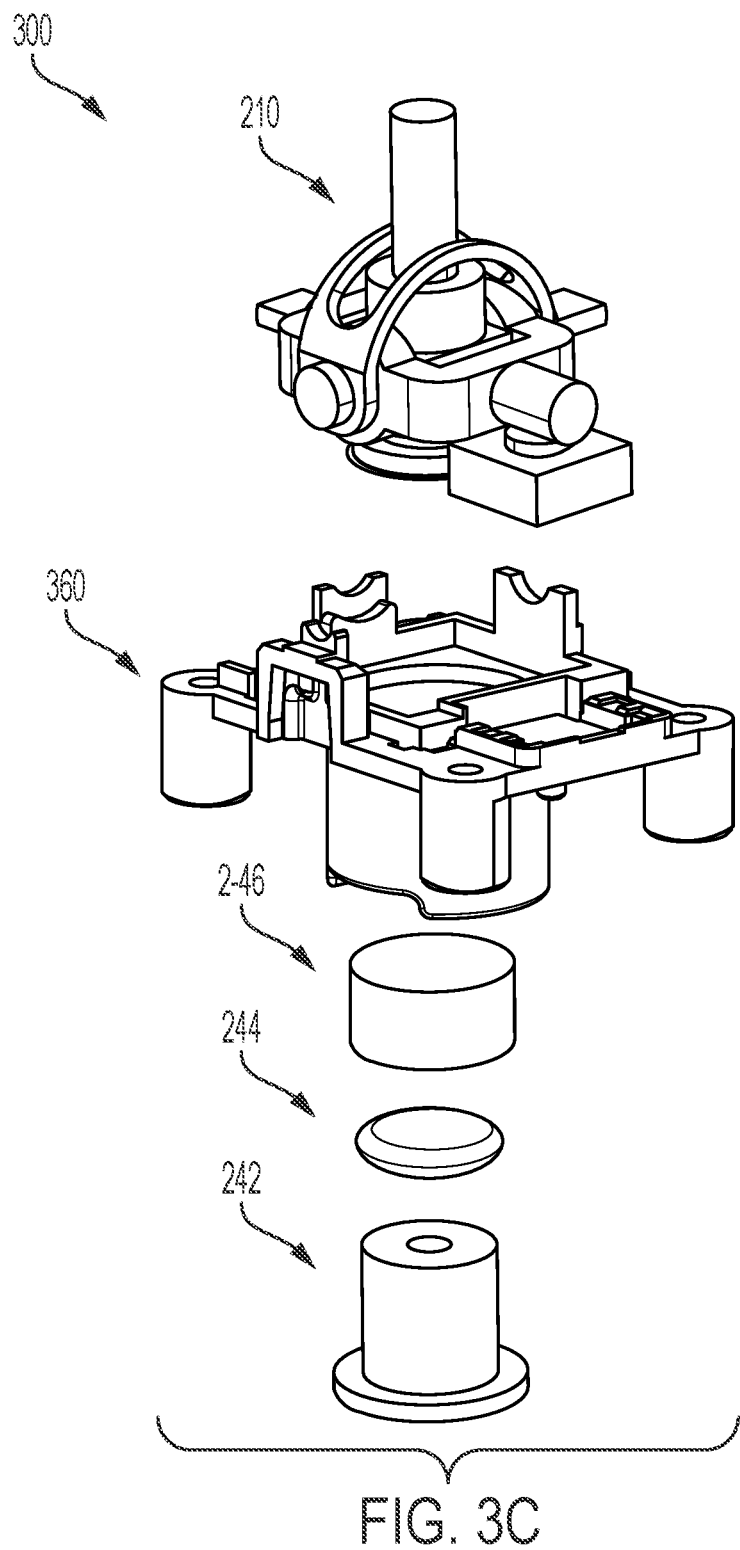
FIG. 3C shows an exploded view of the user input device of FIG. 3A.
Figure 3D:
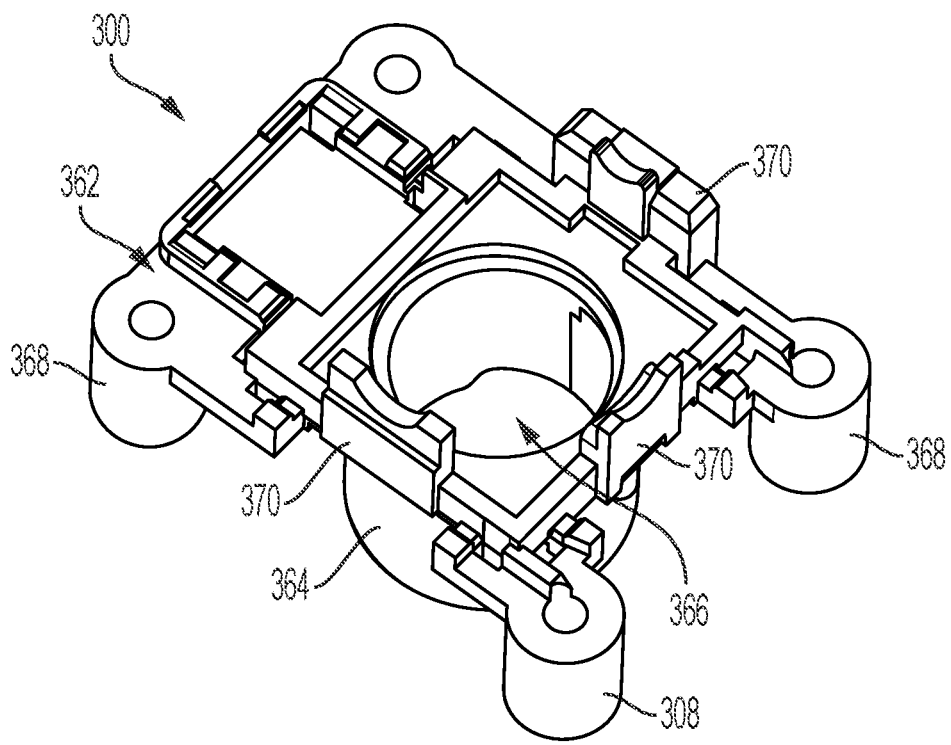
FIGS. 3D and 3E show perspective views of a housing of the user input of FIG. 3A.
Figure 3E:
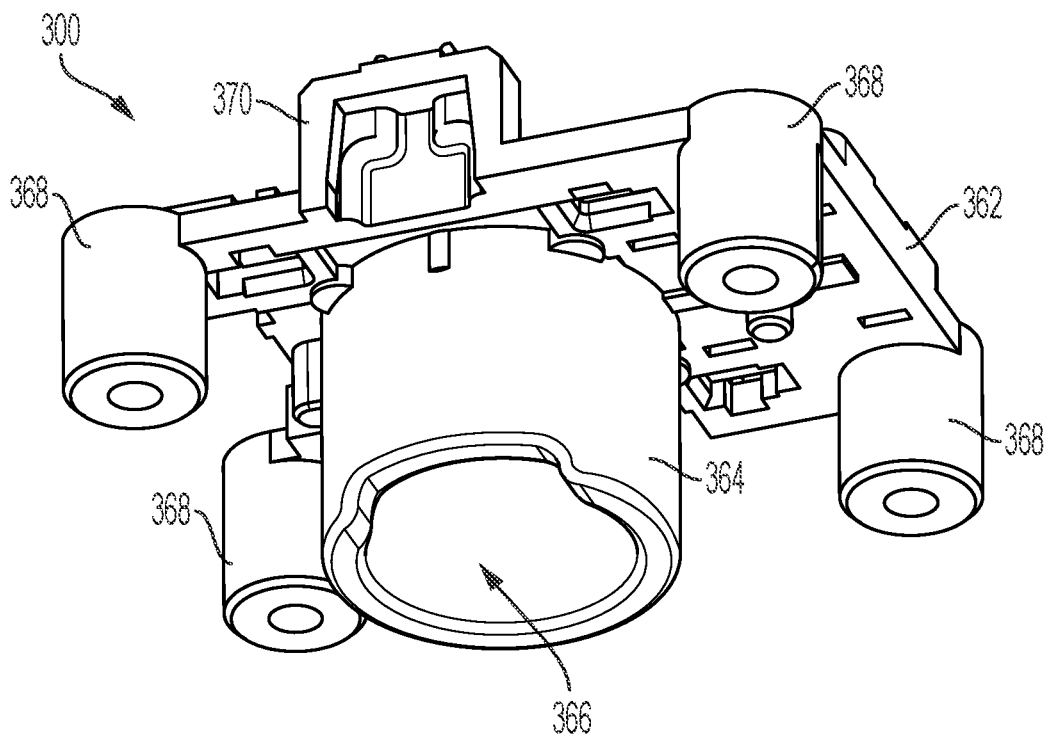

Referring to FIG. 3A-3H, views of an example of a user-input device 300 (device 300) are shown. For example, FIGS. 3A and 3B show perspective views of an example of device 300; FIG. 3C shows an exploded view of an example of device 300; FIGS. 3D and 3E show perspective views of an example of a first housing 360 of device 300; FIG. 3F shows another perspective view of device 300; and FIGS. 3G and 3H show a perspective sectional view and a side sectional view of device 300, respectively.

Device 300 includes a first housing 360 configured to be coupled to a joystick assembly, such as joystick assembly 110, 210. As shown, device 300 includes joystick assembly 210, magnetic resistance mechanism 240, and first housing 360 configured to accommodate, or be coupled to, the joystick assembly and the magnetic resistance mechanism. Although device 300 is shown and described with respect to joystick assembly 210 and magnetic resistance mechanism 240, in other configurations, the device 300 can include another joystick assembly or magnetic resistance mechanism. Device 300 may also include one or more additional components that are not illustrated to improve clarity, such as one or more electrical components or other circuitry.

First housing 360 includes a platform 362 and a body 364 (e.g., cylindrical body) extending from the platform to define a chamber 366 configured to accommodate one or more components of magnetic resistance mechanism 240. Platform 362 is configured to receive or be coupled to a joystick assembly (e.g., 210) and, in some configuration, the platform 362 can be interposed between joystick 212 and magnetic resistance mechanism 240. In the depicted configurations, body 364 includes a cylindrical shell extending downwardly from platform 363 to define chamber 366 and is configured to surround, first magnet 342, second magnet 344, stabilizer 346, base 320, or combination thereof. As shown in FIG. 3C, first housing 360 may be positioned such that chamber 366 is aligned with joystick 212 and magnetic resistance mechanism 240. Body 364 can cooperate with stabilizer 246 to prevent second magnet 244 from moving in an undesired direction (e.g., horizontally). To illustrate, FIGS. 3G and 3H depict a portion (e.g., sidewalls) of stabilizer 246 being interposed between body 364 and first magnet 242 while the stabilizer and second magnet 244 move. Accordingly, first housing 360 may provide further stability to magnetic resistance mechanism 240 while device 300 is in operation.

In some configurations, first housing 360 can include one or more posts 368, one or more supports 370, or both. Posts 368 extend from platform 362 and are configured to couple housing 360 to another component such as, for example, another housing (e.g., 480), a printed circuit board, or the like. In some such configurations, post 368 extend from platform 362 in the same direction as body 364 and can include or accommodate one or more fasteners to couple the posts to another component. In a non-limiting example, post 368 can define an aperture having one or more grooves that is configured to receive a fastener (e.g., bolt, screw, or the like). Although first housing 360 is depicted with four posts 368, other configurations of housing 360 can include more or less posts. Supports 370 extend from platform 362 and are configured to receive or be coupled to joystick assembly 210. For example, in some configurations, supports 370 can be shaped to receive a portion of first or second members 226, 228. More specifically, each support 370 can include a curved portion that is configured to rotatably support an end of first or second member 226, 228. Supports 370 can extend from platform 362 is a direction that is opposite of body 364, posts 368, or both.

Figure 4A:
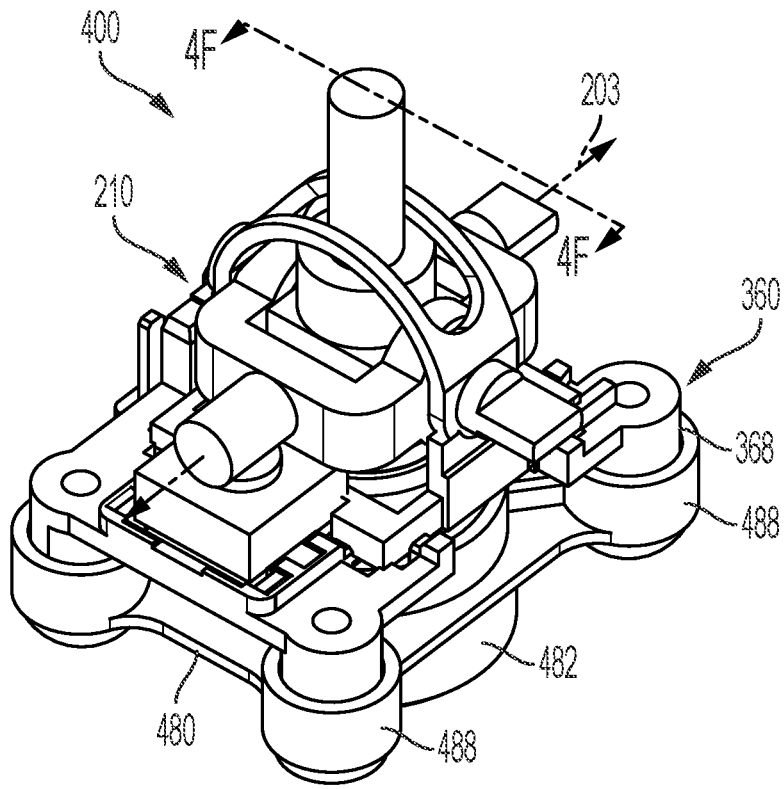
FIGS. 4A and 4B show perspective views of another example a user input device according to one or more aspects of the present disclosure.
Figure 4B:
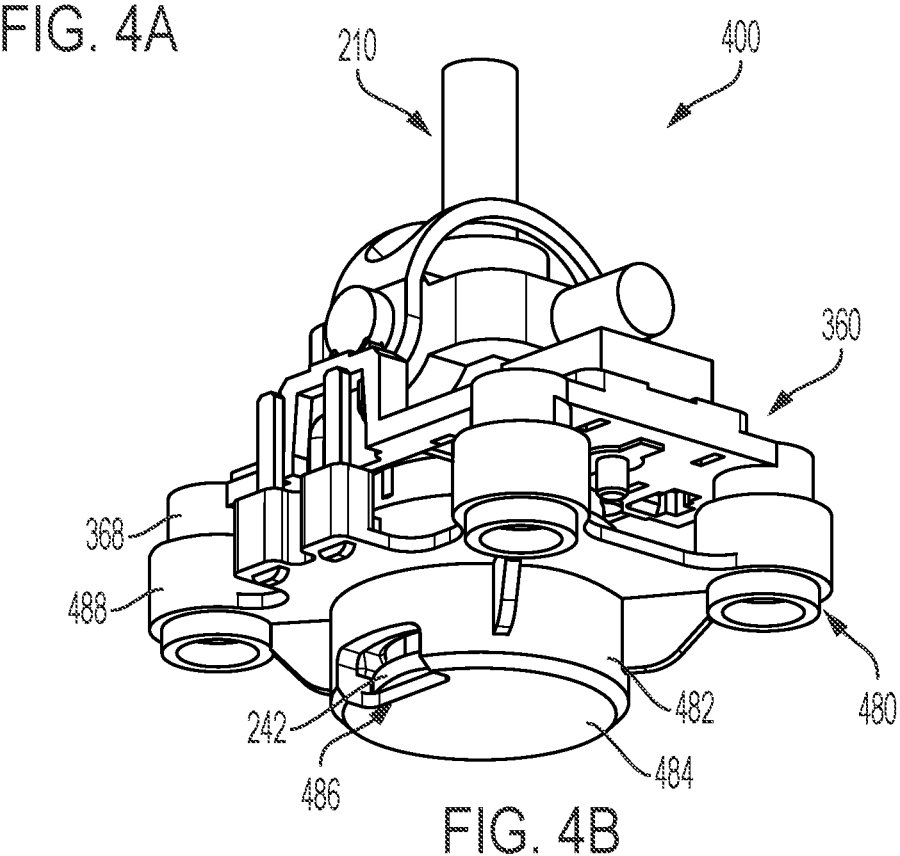
Figure 4C:
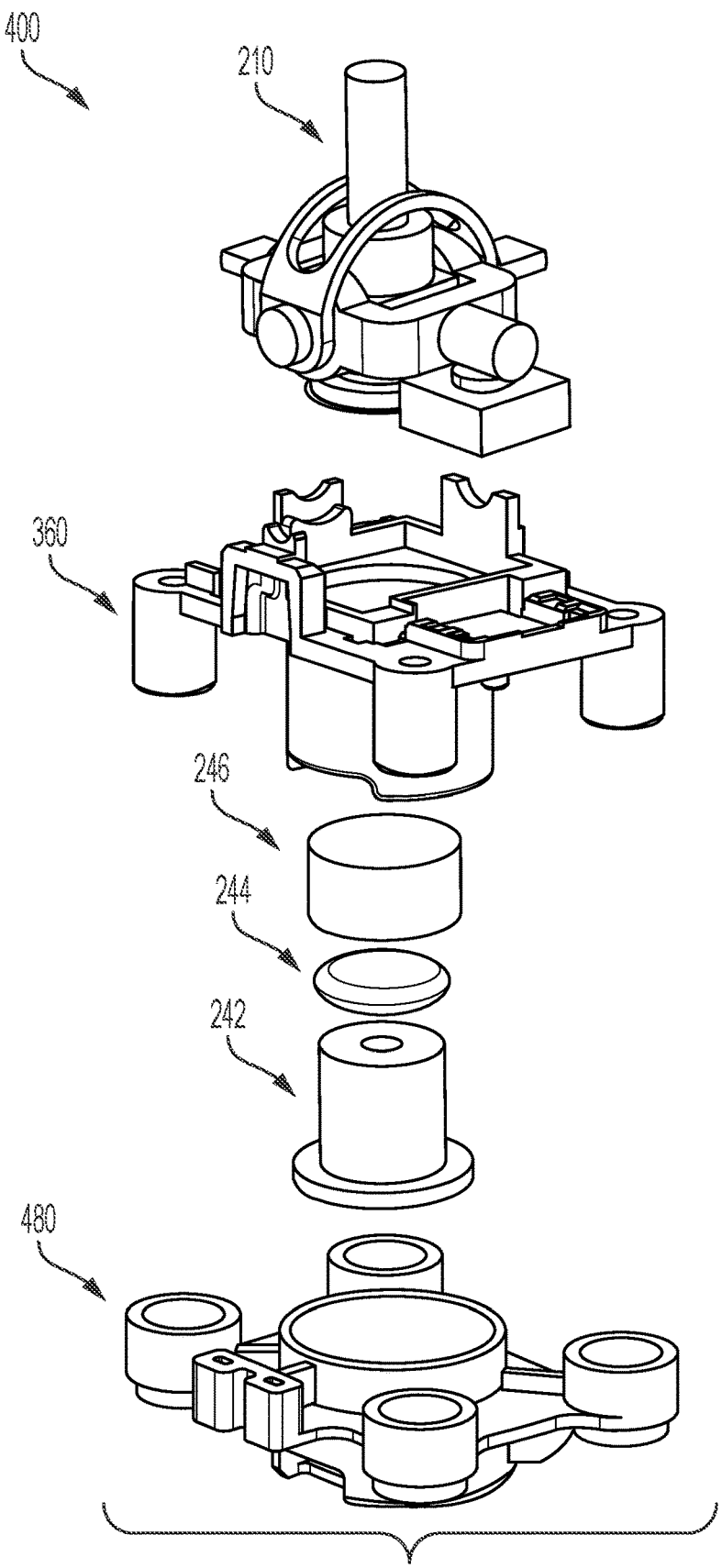
FIG. 4C shows an exploded view of the user input device of FIG. 4A.
Figure 4D:
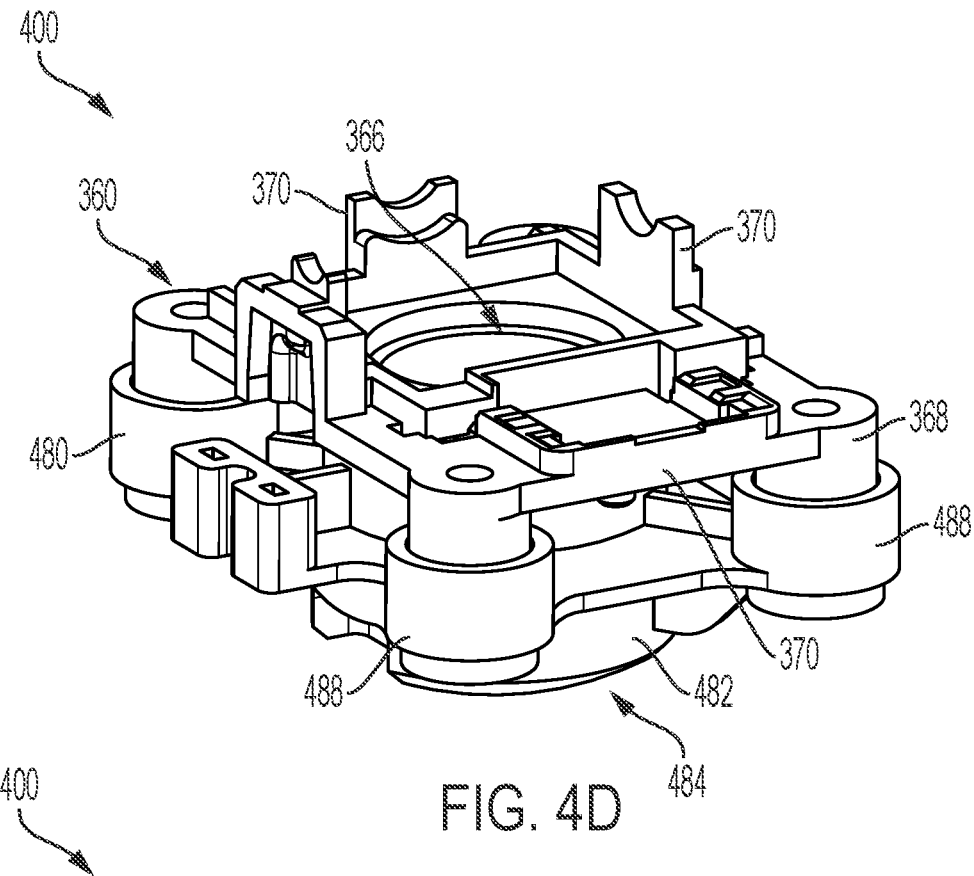
FIGS. 4D and 4E show perspective views of a housing of the user input of FIG. 4A.
Figure 4E:
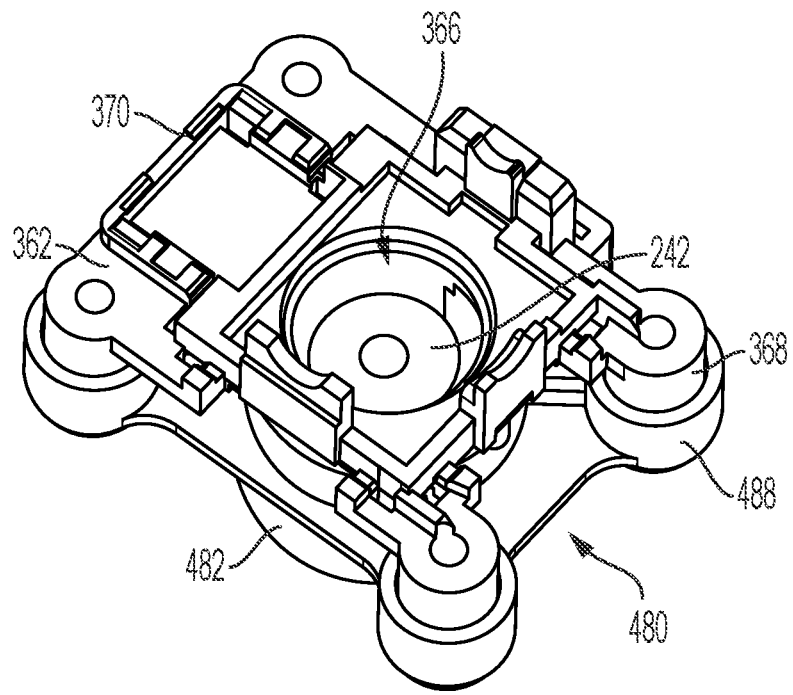
Figure 4F:
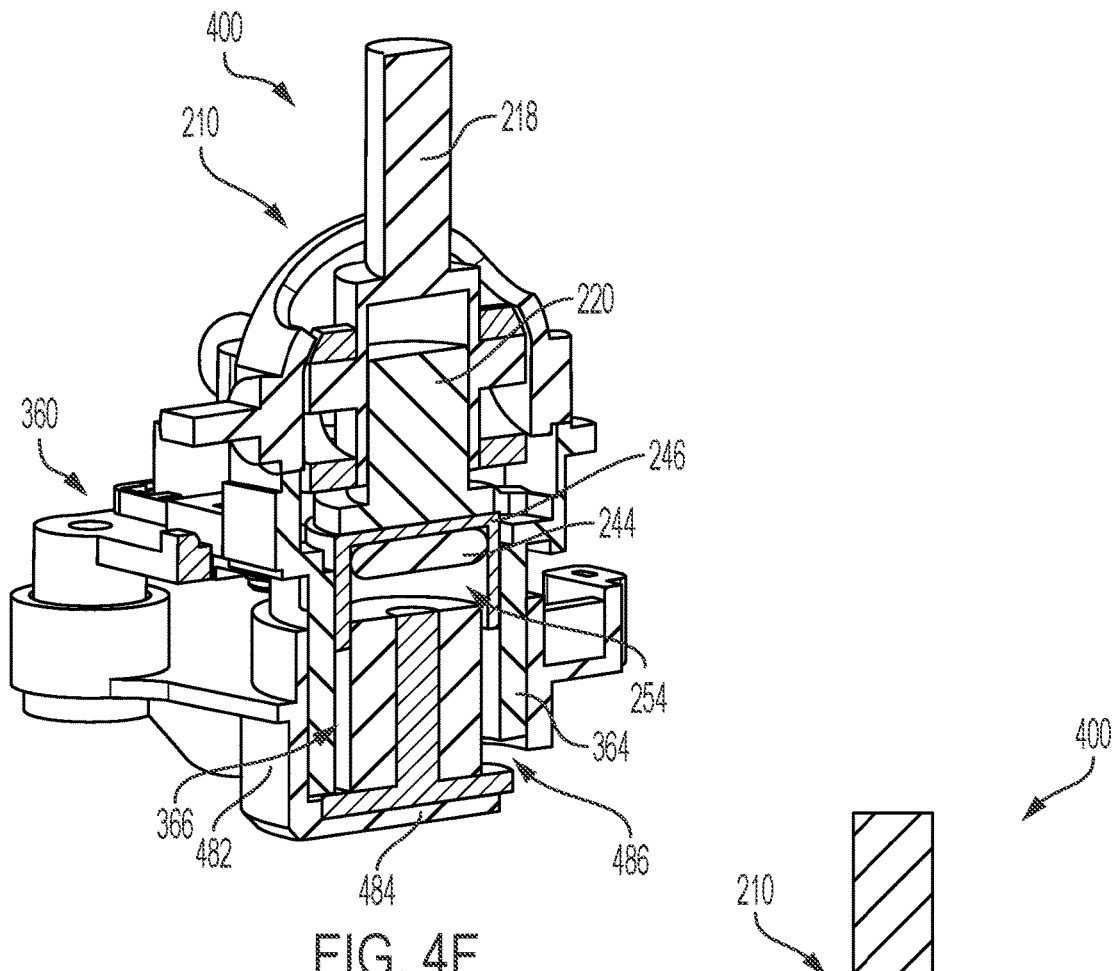
FIGS. 4F and 4G are perspective sectional views of the user input device taken about plane 4F-4F of FIG. 4A.
Figure 4G:
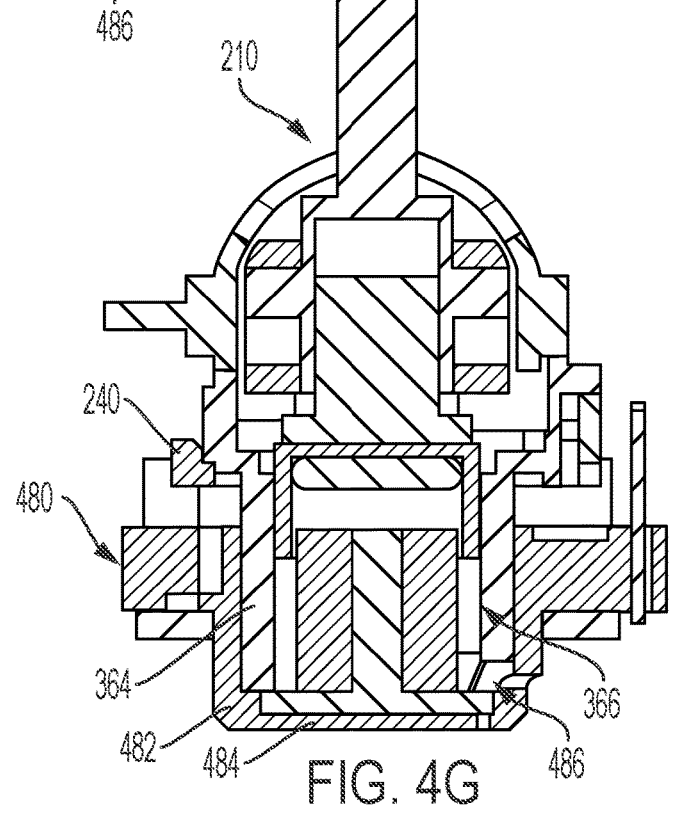

Referring to FIG. 4A-4G, views of an example of a user-input device 400 (device 400) are shown. For example, FIGS. 4A and 4B show perspective views of an example of device 400; FIG. 4C shows an exploded view of an example of device 400; FIGS. 4D and 4E show perspective views of an example of a first and second housing of device 400; and FIGS. 4F and 4G show a perspective sectional view and a side sectional view of device 400, respectively.

Device 400 includes a second housing 480 configured to be coupled to a joystick assembly, such as joystick assembly 110, 210. As shown, device 400 includes joystick assembly 210, magnetic resistance mechanism 240, first housing 360, and second housing 480. Although device 400 is shown and described with respect to joystick assembly 210 and magnetic resistance mechanism 240, in other configurations, the device 400 can include another joystick assembly or magnetic resistance mechanism.

Second housing 480 includes a body 482 having a base 484 (FIGS. 4G and 4H) that defines a chamber 486 configured to accommodate one or more components of magnetic resistance mechanism 240. In some configurations, first magnet 242 is configured to be coupled to base 484 when magnetic resistance mechanism 240 is disposed within chamber 486. Second housing 480 can be coupled to first housing 360 to define a device housing that is configured to couple joystick assembly 210 to magnetic resistance mechanism 240. For example, body 364 of first housing 360 can be disposed within chamber 486 such that the chamber 486 of second housing 480 and chamber 366 of the first housing may cooperate to define a larger chamber, in which magnetic resistance mechanism 240 is disposed. In the depicted configurations, body 482 includes a cylindrical shell extending upwardly from base 484 to define chamber 486 and is configured to surround, body 364 of first housing 360, first magnet 342, second magnet 344, stabilizer 346, base 320, or combination thereof.

Figure 5A:
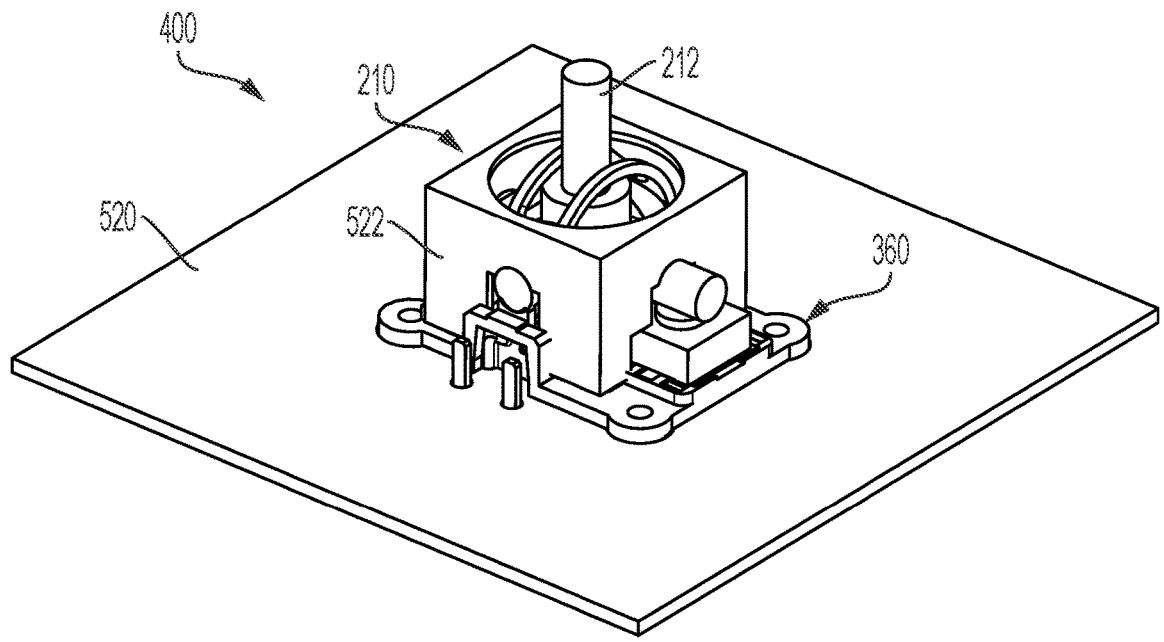
FIG. 5A shows a perspective view of another example a user input device according to one or more aspects of the present disclosure.
Figure 5B:
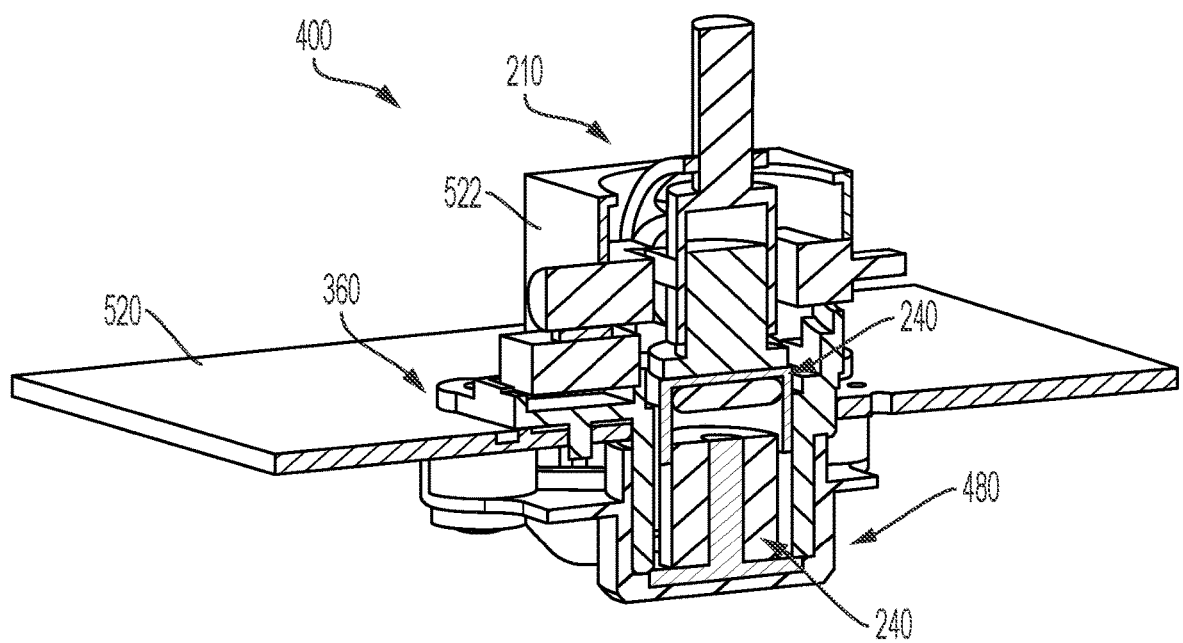
FIG. 5B shows a perspective sectional view of the user input device of FIG. 5A.

In some configurations, second housing 480 can define one or more receptacles 488 that are configured to receive a respective post 368 of first housing 360. Receptacles 488 can define a cylindrical chamber having a diameter that is greater than post 368 so that the post can be placed within the cylindrical chamber to secure second housing 480 to first housing 360. Additionally, or alternatively, receptacles 488 can define one or more other coupling features such as, for example, an aperture having one or more grooves that is configured to receive a fastener (e.g., bolt, screw, or the like). Device 400 may also include one or more additional components that are not illustrated to improve clarity, such as one or more electrical components or other circuitry. For example, as shown in FIGS. 5A and 5B, device 400 may include or be coupled to a printed circuit board (PCB) 520. Additionally, or alternatively, device 400 may include a joystick cover 522 coupled to a joystick assembly (e.g., 210). In some configurations, first housing 360, second housing 480, and joystick cover 522 may collectively include or correspond to the device housing (e.g., 122).

In some configurations, components of the user-input device described herein can be configured to operate with some aspects of conventional user-input devices. For example, magnetic resistance mechanism 240, first housing 360, second housing 480, or combination thereof, may be configured to operate with a conventional joystick assembly. In this manner, some aspects of the user-input device described herein can be retrofitted to operate with existing gaming controllers. Accordingly, in some aspects, the present user-input devices can provide the above described benefits without having to completely replace a gaming controller.

Figure 6A:
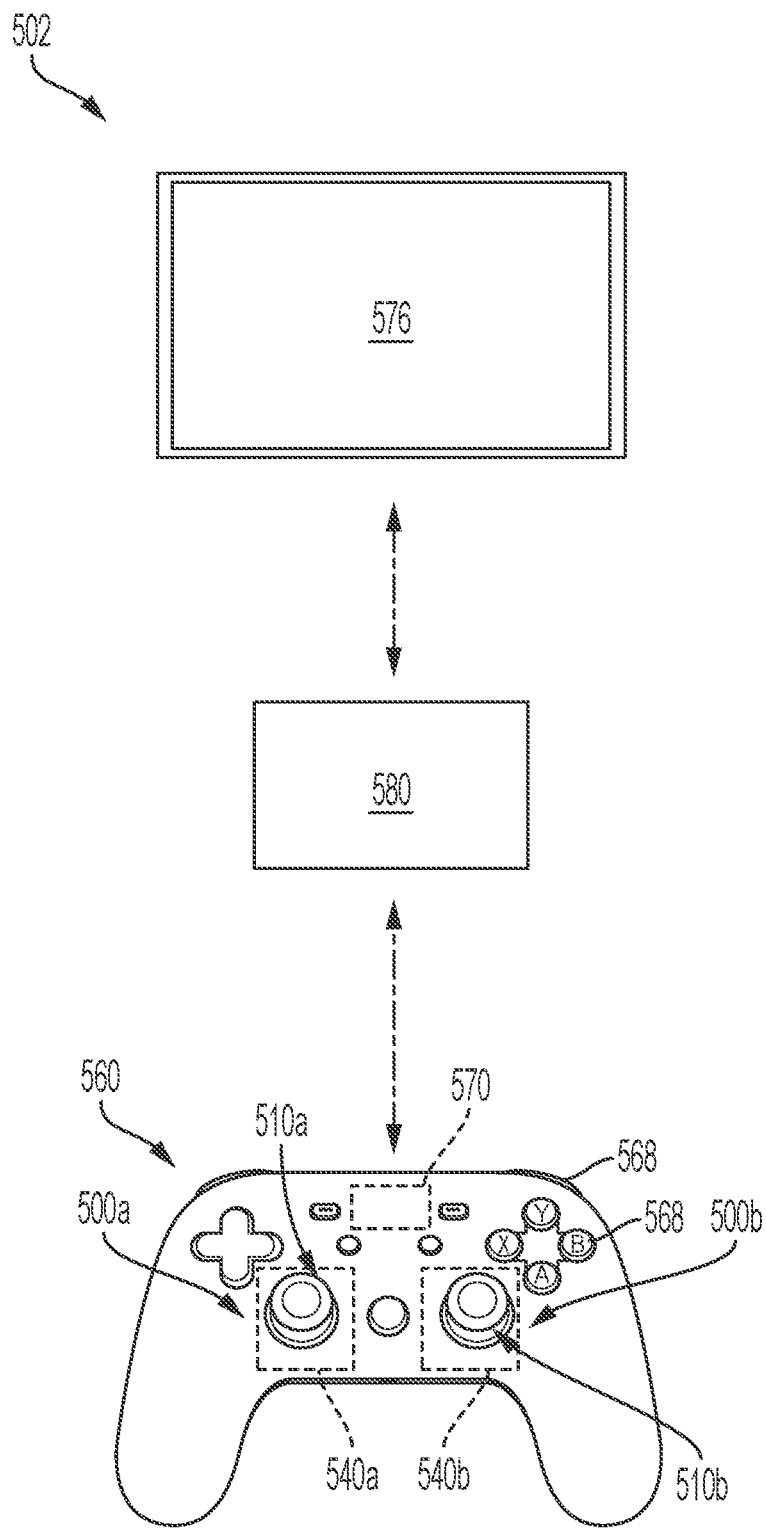
FIG. 6A is a schematic diagram of an example of a system that includes a user input device according to one or more aspects of the present disclosure.
Figure 6B:
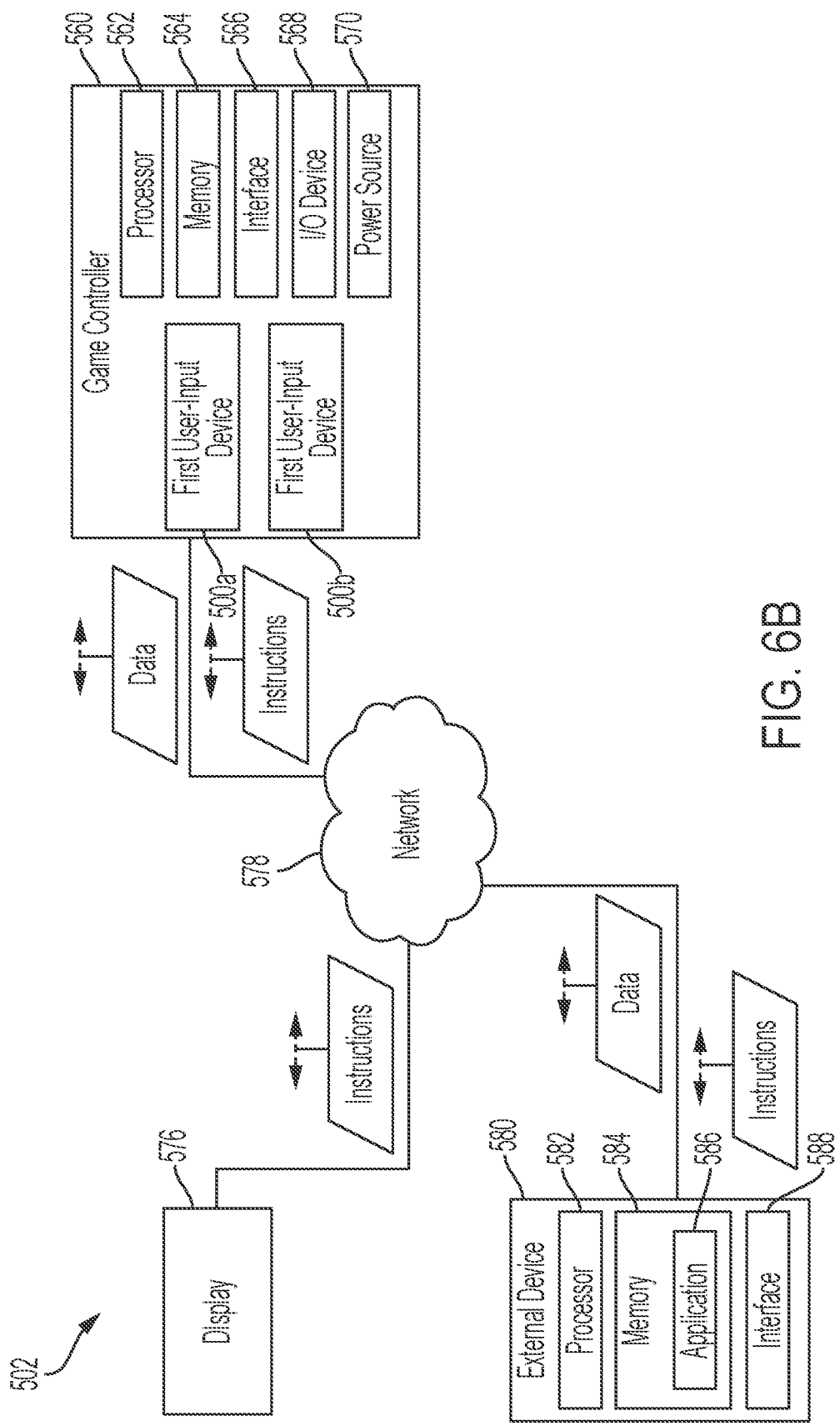
FIG. 6B is a block diagram of an example of the system of FIG. 5A.

Referring now to FIGS. 6A and 6B, a system 502 for receiving user input and/or providing feedback through a user-input device (e.g., 500a, 500b) is shown. System 502 includes one or more controllers 560 having a user-input device 500, a display 576, and one or more information handling systems (IHS) 580 (e.g., video game console, entertainment console, or other multimedia device) configured to operate one or more electronic applications (e.g., video games). Controller 560 is in communication with IHS 580 (e.g., wired or wireless communication) and is configured to send and receive signals with the external device to navigate or otherwise control the electronic applications. For example, as shown in FIG. 6B, controller 560 is a video game controller, IHS 580 is a gaming console, and display 576 is a television. In some such configurations, the various devices of system 502 (e.g., controller 560, IHS 580, and display 576) may be communicatively coupled to each other via one or more networks 578 (e.g., a Bluetooth personal area network (PAN), an Ethernet local area network (LAN), a wireless local area network, a wide area network (WAN) or other network). In other configurations, display 576 and IHS 580 may be integrated with controller 560 such that the applications are executed at the controller (e.g., mobile gaming console).

Controller 560 includes a first user-input device 500a and a second user-input device 500b. First device 500a includes a joystick assembly 510a coupled to a magnetic resistance mechanism 540a and second device 500b includes a joystick assembly 510b coupled to a magnetic resistance mechanism 540b. First device 400a and second device 400b may include or correspond to devices 100, 200, 300, 400. A user may operate (e.g., rotate) a joystick of the first and second device 400a, 400b, as described herein, to provide input to IHS 580.

As shown in FIG. 6B, controller 560 may include processor 562, a memory 564, an interface 566, an input/output (I/O) device 568, a power source 570, or combination thereof. The illustration of controller 560 in FIG. 6B is illustrative and, in some other implementations, the controller may not include all of the components shown, may include additional components, or both. Processor 562 may be a central processing unit (CPU) or other computing circuitry (e.g., a microcontroller, one or more application specific integrated circuits (ASICs), and the like) and may have one or more processing cores. Memory 564 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 564 may store instructions that, when executed by processor 562, cause processor 562 to perform operations in connection with controller 560. Additionally, memory 564 may store one or more thresholds, data, preferences, or other settings. For example, memory 564 may store one or more magnetic field thresholds, resistance thresholds, or the like.

Interfaces 566, such as wireless interfaces, may be configured to enable wireless communication between controller 560 and external device 580, display 576, or both. In some implementations, wireless interfaces 566 include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or the like. I/O device 568 includes one or more switches (e.g., depressible buttons, triggers, or the like), directional pads, one or more touchscreens, a microphone, a camera, one or more speakers, one or more light sources, vibration devices, or other types of devices that enable a user to receive information from or provide information to controller 560.

IHS 580 is configured to support and operate one or more electronic applications (e.g., 586), such as a video game, video streaming platform, music streaming platform, or other media platform. IHS 580 is referred to broadly and includes any suitable processor-based device such as, for example, video game console, a hand-held console, a desktop computer, a laptop computer, or a mobile computing device a tablet, a digital media or entertainment device, or another type of electronic device. IHS 580 may include at least a processor 582, a memory 584, and an interface 588 to enable communication with controller 560, and optionally with display 576. Processor 582 may be configured to execute instructions stored at memory 584 to cause external device 580 to perform the operations described herein. In some implementations, IHS 580 can be configured to access a wireless network or the Internet (e.g., via an application on IHS 580) or to access a web application or web service hosted by a server, and thereby provide a user interface for enabling a user to access an application 586. In some configurations, IHS 580 is configured to act as an intermediary between controller 560 and display 576. For example, IHS 580 may receive a user input from controller 560 (e.g., at device 500a) and transmit the user input to display 576 to change the displayed environment (e.g., navigating between icons, rotating a point of view of a character, selecting a visual prompt, or otherwise changing the display environment). In some configurations, IHS 580 is configured to send instructions (e.g., signals) to controller 560 to transmit information to the user. For example, based on a programmable setting of application 586, IHS 580 may transmit one or more instructions to cause device 500a, device 500b, or both, to adjust a resistance of the magnetic resistance mechanisms (e.g., 540a, 540b). In some configurations, a user may transmit (e.g., via controller 560) a target resistance to IHS 580, which can then transmit one or more signals to controller 560 to adjust a resistance of one or more of the resistance mechanisms (e.g., 540a, 540b) to the target resistance. In some such configurations, the target resistance may be selected locally, for a single application (e.g., 586), or globally, for all applications (e.g., 586).

Figure 7:
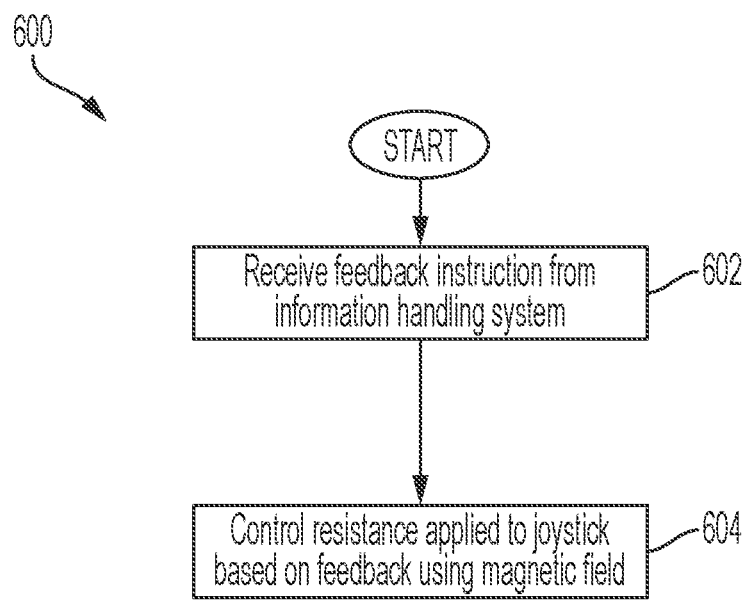
FIG. 7 illustrates a flow diagram of an example of a method of operating a user input device according to one or more aspects of the present disclosure.

Referring to FIG. 7, a method 600 of operating a user input device, such as device 100, 200, 300, 400, 500a, 500b, or the like, is shown. Method 600 may be performed at, by, or with device 100, 200, 300, 400, 500a, 500b, or one or more components thereof, such as a joystick assembly or a magnetic resistance mechanism. Method 600 includes receiving feedback instruction from an information handling system, at 602. The information handling system can include or correspond to a processor configured as a controller (e.g., processor 132, 562, 582, or the like), a memory configured to store one or more instructions that are executed by the processor (e.g., memory 134, 564, 584, or the like). The feedback instruction may include values for controlling a resistance of a joystick while the joystick rotates about a first and second axis. The values can include or correspond to joystick position data (e.g., a relative distance between an active position and the default position), resistance data, game configuration data (e.g., data or instructions from an external gaming device), one or more thresholds such as positional thresholds, rotation thresholds, resistance thresholds, or combination thereof.

Method 600 further includes controlling a resistance torque applied to a joystick (e.g., joystick 112, 212, 510a, 510b) as the joystick rotates about a first or second axis (e.g., 103, 105), at 604. To illustrate, a magnetic resistance mechanism (e.g., 140, 240, 540a, 540b) may be operated based on the feedback to control the resistance applied to the joystick, as described above. For example, the magnetic resistance mechanism may maintain or adjust the resistance based on a user input, an input from a computer application, dynamically based on events occurring in an application (such as feedback from events in a gaming application), or a combination thereof. In some configurations, the magnetic resistance mechanism may control the resistance based on joystick position data (e.g., a relative distance between an active position and the default position), resistance data, game configuration data, or the like. As a non-limiting example, a processor can receive an input associated with a target resistance and control the magnetic resistance mechanism to operate at the target resistance. In a specific configuration, processor may control an electrical current supplied to a first magnet to adjust the magnetic resistance mechanism to the target resistance.

Method 600 may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), or other optical disk storage, magnetic disk storage or other magnetic storage devices, or any other medium that can be used to store desired program code in the form of instructions or data structures and that can be accessed by a computer. Combinations of the above should also be included within the scope of computer-readable media. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:
1. An apparatus, comprising:
a shaft configured to rotate about a first axis and a second axis, the shaft having a first end and a second end opposite the first end;
a first magnet configured to emit a controllable magnetic field; and
a second magnet interposed between the first magnet and the first end of the shaft, wherein the second magnet is configured to provide a force on the first end of the shaft such that the second magnet resists rotation of the shaft about at least one of the first or second axes while the first magnet emits the controllable magnetic field.

2. The apparatus of claim 1, wherein the first magnet comprises an electromagnet configured to operate in:
a first state, in which the first magnet emits a magnetic field having a first intensity; and
a second state, in which the first magnet emits a magnetic field having a second intensity that is greater than that of the first intensity.

3. The apparatus of claim 2, wherein the first magnet is configured to operate in a third state, in which the first magnet does not emit a magnetic field.

4. The apparatus of claim 3, wherein based on the first magnet being in the first or second state, the second magnet is configured to bias the shaft to a default position.

5. The apparatus of claim 2, further comprising a processor coupled to the first magnet and configured to actuate the first magnet between the first state and the second state.

6. The apparatus of claim 5, wherein, while the shaft is in a default position and the processor actuates the first magnet from the first state to the second state:
a distance between the first magnet and the second magnet increases.

7. The apparatus of claim 1, further comprising a stabilizer interposed between the second magnet and the first end of the shaft, the stabilizer defining a cavity configured to accommodate the first and second magnet.

8. The apparatus of claim 7, wherein the first magnet comprises a solenoid device and the second magnet comprises a permanent magnet.

9. A user input device, comprising:
a housing that defines a chamber;
a shaft coupled to the housing and configured to rotate relative to the housing about a first axis and a second axis, the shaft comprising a base and a post extending from the base;
a first magnet disposed within the chamber and configured to emit a controllable magnetic field; and
a second magnet configured to abut the base of the shaft such that rotation of the shaft about at least one of the first axis or the second axis moves the second magnet in a first direction,
wherein the second magnet is configured to provide a force on the shaft such that the second magnet resists rotation of the shaft about at least one of the first or second axes while the first magnet emits the controllable magnetic field.

10. The user input device of claim 9, wherein, while the first magnet emits the magnetic field, the second magnet resists movement in the first direction.

11. The user input device of claim 9, further comprising a stabilizer configured to limit movement of the second magnet along the first and second axis.

12. The user input device of claim 11, wherein:
the base of the shaft includes a maximum transverse dimension that is greater than a maximum transverse dimension of the post; and
the second magnet includes a maximum transverse dimension that is greater than the maximum transverse dimension of the base.

13. The user input device of claim 11, wherein, when the shaft is in a central position, the shaft, the post and the second magnet are coaxial.

14. The user input device of claim 9, further comprising:
a power source configured to deliver electrical current to the first magnet; and
a processor in coupled to the power source and configured to control an intensity of the controllable magnetic field emitted by the first magnet.

15. The user input device of claim 14, wherein:
based on receiving a first signal, the processor is configured to operate the first magnet in a reserve state;
based on receiving a second signal, the processor is configured to operate the first magnet in an energized state, in which the intensity of the magnetic field emitted by the first magnet is greater than that in the reserve state; and
a force applied to the shaft by the second magnet is greater while the first magnet is in the energized state than while the first magnet is in the reserve state.

16. A gaming system, comprising:
a gaming controller configured to transmit a plurality of user input signals to an information handling system, the gaming controller comprising:
a joystick configured to rotate about a first axis and a second axis based on user input;
a magnetic resistance mechanism configured to selectively resist rotation of the joystick about at least one of the first axis or the second axis, wherein the magnetic resistance mechanism comprises:
a first magnet configured to emit a controllable magnetic field; and
a second magnet configured to provide a force on a first end of the joystick such that the second magnet resists rotation of the joystick about at least one of the first axis or the second axis while the first magnet emits the controllable magnetic field.

17. The gaming system of claim 16, the first magnet comprising a solenoid device and the second magnet comprising a permanent magnet.

18. The gaming system of claim 16, further comprising a processor coupled to the magnetic resistance mechanism and configured to:
receive a first input associated with a target resistance value; and
based on the target resistance value, operate the magnetic resistance mechanism to emit a first magnetic field having a first field strength.

19. The gaming system of claim 18, wherein:
the processor is configured to:
receive a second input associated with a second resistance value; and
based on the second input, operate the magnetic resistance mechanism to emit a second magnetic field having a second field strength that is greater than the first field strength; and
while the magnetic resistance mechanism emits the first magnetic field, the magnetic resistance mechanism applies a first resistance to the joystick; and
while the magnetic resistance mechanism emits the second magnetic field, the magnetic resistance mechanism applies a second resistance to the joystick, the second resistance being greater than the first resistance.

* * * * *